(12) United States Patent
Negri et al.

(10) Patent No.: US 9,249,578 B2
(45) Date of Patent: Feb. 2, 2016

(54) JOINT COMPOUND, WALL ASSEMBLY, AND METHODS AND PRODUCTS RELATED THERETO

(71) Applicant: United States Gypsum Company, Chicago, IL (US)

(72) Inventors: Robert H. Negri, Lake Villa, IL (US); Mark Miklosz, Western Springs, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 14/500,333

(22) Filed: Sep. 29, 2014

(65) Prior Publication Data

US 2015/0083303 A1  Mar. 26, 2015

Related U.S. Application Data

(62) Division of application No. 13/842,342, filed on Mar. 15, 2013, now Pat. No. 8,931,230.

(60) Provisional application No. 61/705,551, filed on Sep. 25, 2012.

(51) Int. Cl.
*E04F 13/04* (2006.01)
*C08K 7/28* (2006.01)
(Continued)

(52) U.S. Cl.
CPC ............... *E04F 13/042* (2013.01); *C04B 26/06* (2013.01); *C04B 26/14* (2013.01); *C04B 26/16* (2013.01); *C04B 26/18* (2013.01); *C08K 7/28* (2013.01); *E04F 13/04* (2013.01); *C04B 2103/0065* (2013.01); *C04B 2111/00681* (2013.01); *C04B 2111/10* (2013.01); *C08L 33/08* (2013.01); *E04F 13/06* (2013.01); *E04F 2013/063* (2013.01); *Y10T 428/26* (2015.01); (Continued)

(58) Field of Classification Search
CPC ... E04F 2013/063; E04F 13/09; E04F 13/042; E04F 13/06; C08K 7/28
See application file for complete search history.

(56) References Cited

U.S. PATENT DOCUMENTS 4,587,173 A    5/1986  Lat et al.
4,657,594 A    4/1987  Struss
(Continued)

FOREIGN PATENT DOCUMENTS

JP    60-223848     11/1985
WO    WO 03/040243   5/2003

*Primary Examiner* — Andrew J Triggs
(74) *Attorney, Agent, or Firm* — Greer, Burns & Crain, Ltd.; Pradip Sahu; Philip T. Petti

(57) ABSTRACT

Disclosed are aspects of board finishing systems. For example, in various aspects, disclosed are joint compound compositions, wall assemblies, methods of treating walls, and products related to any of the foregoing, including reinforcement trim, e.g., for protecting corners where boards meet, fasteners, and tape. The joint compound preferably is a drying type composition with reduced shrinkage property, and includes binder and hollow spheres, resulting in an ultra lightweight formulation in some embodiments. The joint compound composition can be applied in a one-coat treatment in preferred embodiments. Other aspects of board finishing system accommodate such a one-coat treatment to thusly allow a user to manipulate the compound closer to the plane of board as compared with conventional formulations. Joint tape and reinforcement trim can include non-swelling synthetic paper facing material in some embodiments.

18 Claims, 18 Drawing Sheets

(51) Int. Cl.

| | | |
|---|---|---|
| *C04B 26/06* | (2006.01) | |
| *C04B 26/14* | (2006.01) | |
| *C04B 26/16* | (2006.01) | |
| *C04B 26/18* | (2006.01) | |
| *C04B 103/00* | (2006.01) | |
| *C04B 111/00* | (2006.01) | |
| *C04B 111/10* | (2006.01) | |
| *E04F 13/06* | (2006.01) | |
| *C08L 33/08* | (2006.01) | |

(52) U.S. Cl.
CPC ... *Y10T 428/3179* (2015.04); *Y10T 428/31507* (2015.04); *Y10T 428/31634* (2015.04); *Y10T 428/31895* (2015.04); *Y10T 428/31982* (2015.04); *Y10T 428/31993* (2015.04)

(56) References Cited

U.S. PATENT DOCUMENTS

| | | | |
|---|---|---|---|
| 4,686,253 A | 8/1987 | Struss et al. | |
| 4,885,203 A | 12/1989 | Wakat | |
| 5,277,712 A | 1/1994 | McInnis | |
| 5,746,822 A | 5/1998 | Espinoza et al. | |
| 6,238,476 B1 | 5/2001 | Sprinkle | |
| 6,295,776 B1 * | 10/2001 | Kunz et al. | 52/255 |
| 6,461,691 B1 | 10/2002 | Taylor et al. | |
| 6,476,099 B1 | 11/2002 | Cimaglio et al. | |
| 6,531,528 B1 | 3/2003 | Kurp | |
| 6,545,066 B1 | 4/2003 | Immordino et al. | |
| 6,722,092 B2 * | 4/2004 | Kunz et al. | 52/255 |
| 6,858,260 B2 | 2/2005 | Taylor et al. | |
| 6,884,830 B1 | 4/2005 | Hornaman | |
| 7,314,898 B2 | 1/2008 | Downing et al. | |
| 7,513,963 B2 | 4/2009 | Frank et al. | |
| 8,034,852 B2 * | 10/2011 | Janssen | C08F 283/01 523/218 |
| 8,642,346 B2 | 2/2014 | Immordino et al. | |
| 8,691,046 B2 | 4/2014 | Jorgenson et al. | |
| 8,931,230 B2 * | 1/2015 | Negri et al. | 52/417 |
| 9,006,302 B2 * | 4/2015 | Amos | C08K 7/28 209/659 |
| 2002/0073638 A1 * | 6/2002 | Kunz et al. | 52/255 |
| 2002/0129744 A1 | 9/2002 | Immordino, Jr. et al. | |
| 2003/0089058 A1 * | 5/2003 | Kunz et al. | 52/255 |
| 2003/0136072 A1 | 7/2003 | Peng | |
| 2004/0182287 A1 | 9/2004 | Ayambem | |
| 2005/0235878 A1 | 10/2005 | Podlas | |
| 2006/0159908 A1 | 7/2006 | Houck et al. | |
| 2008/0141909 A1 | 6/2008 | Immordino et al. | |
| 2008/0245026 A1 | 10/2008 | Hamilton | |
| 2010/0175590 A1 | 7/2010 | Stevens et al. | |
| 2010/0294430 A1 | 11/2010 | Hyman et al. | |
| 2012/0031555 A1 | 2/2012 | Thompson et al. | |
| 2013/0143980 A1 | 6/2013 | Fasula et al. | |
| 2013/0156961 A1 | 6/2013 | Heulings et al. | |
| 2014/0083035 A1 * | 3/2014 | Negri et al. | 52/353 |
| 2014/0083038 A1 * | 3/2014 | Negri et al. | 52/415 |
| 2014/0100309 A1 | 4/2014 | Rosenthal et al. | |
| 2015/0007519 A1 * | 1/2015 | Negri et al. | 52/417 |
| 2015/0083303 A1 * | 3/2015 | Negri et al. | 156/71 |

* cited by examiner

JOINT COMPOUND, WALL ASSEMBLY, AND METHODS AND PRODUCTS RELATED THERETO

CROSS-REFERENCE TO RELATED APPLICATIONS

This patent application is a divisional patent application of U.S. patent application Ser. No. 13/842,342, filed Mar. 15, 2013 which claims the benefit of U.S. Provisional Patent Application No. 61/705,551, filed Sep. 25, 2012, which are incorporated herein by reference in their entirety.

BACKGROUND OF THE INVENTION

In building construction, different types of claddings are used as panels for forming interior and exterior wall and ceiling surfaces. For simplicity, as used herein, it will be understood that the term "wall" also encompasses ceilings. Typically, the claddings are in the form of boards (also referred to as panels) affixed to framing members such as in balloon framing arrangements known in the art. Examples of claddings include gypsum board faced with paper, fibrous mats (e.g., fiberglass) and the like. These and other types of boards are typically cut to appropriate dimensions and then fastened to framing members, e.g., with screws, nails, or the like to form wall sections formed from multiple boards.

Such wall sections are normally finished to provide aesthetically pleasing, uniform, and protected surfaces. For example, two side-by-side boards disposed in the same plane will form a joint seam between them on vertical walls and horizontal ceilings. To finish the seam, joint reinforcement tape is embedded in the seam, along with a layer of joint compound under the tape, and multiple coats of joint compound applied over the tape. Some boards meet at an angle such as when forming a corner. Reinforcement bead can be utilized to hide the corner seam and to protect the corner. Reinforcement bead can be directly attached to the board using fasteners or a layer of joint compound is applied under the trim to adhere the reinforcement bead to the board. The installed reinforcement is then concealed with multiple layers of joint compound applied over the trim. Fasteners used to affix the board to framing members must also be concealed with multiple layers of joint compound applied over them. After the various joint compound applications are dried, the resulting wall surfaces can be sanded and painted to form the desired uniform and aesthetically pleasing appearance.

The level of finishing as described above can vary. For example, with respect to gypsum wallboard, six (6) levels of gypsum board finish are understood in the art, ranging from zero (no treatment at all) to level five (the highest level of finish), as set forth in Gypsum Association document GA-214 and ASTM C840. The level of finish generally corresponds with the number of applications of joint compound to seams, trims, and fasteners. Levels three, four, and five are typically used for occupied spaces within buildings. For single family homes, level 4 is the most common level that is implemented. Level five is less frequently used, and usually requires application of a skim coat of joint compound across the entire wall surface.

Conventional approaches for finishing wall assemblies as described above have not been fully satisfactory. The materials conventionally used to finish wall assemblies create significant inefficiencies in the process, and also require an advanced level of skill to use effectively. For example, existing joint compounds require three separate coats to be applied to fasteners as well as multiple coats applied to flat seams between boards in the same plane and to corner seams. Each coat must separately dry which introduces significant downtime in the construction process, particularly since the other construction trades ordinarily cannot work inside the building while the wall finishing occurs. Each layer of joint compound can require about a day to dry, and it typically can take about a week to install the gypsum board and finish the flat joints, fasteners, and corner trims for a typical new construction of a home of 2,400 square feet of living space (corresponding to about 10,000 square feet of board).

In addition, the need for applying multiple coats of joint compound requires that the user manipulate the joint compound significantly above the plane of the board. To allow the board to appear flat to the naked eye (even though it is not), significant skill and workmanship is required to achieve the proper visual appearance when the user is functioning above the plane of the board. The additional layers of joint compound must be feathered out wider and wider from the seam in a graduated manner to make the seam appear aesthetically flat. If the user is not significantly skilled, the visual appearance will not be satisfactory.

It will be appreciated that this background description has been created by the inventors to aid the reader, and is not to be taken as a reference to prior art, nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

In one aspect, the invention provides a drying-type joint compound composition. The joint composition comprises, consists, or consists essentially of binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi, as measured according to ASTM D3102-78.

In another aspect, the invention provides a joint compound composition consisting essentially of (a) latex emulsion binder in an amount from about 3% to about 90% by weight of the wet composition; (b) a plurality of hollow spheres having an average isostatic crush strength of at least about 100 psi, as measured according to ASTM D3102-78, wherein the spheres are present in an amount from about 5% to about 25% by weight of the wet composition; (c) nonionic surfactant in an amount from about 0.001% to about 5% by weight of the wet composition; and (d) humectant in an amount from about 0.001% to about 3% by weight of the wet composition; and, optionally, (e) defoamer in an amount from about 0.05% to about 5% by weight of the wet composition; (f) rheological modifier in an amount from about 0.1% to about 5% by weight of the wet composition; and (g) biocide, in an amount from about 0.1% to about 1.5% by weight of the wet composition.

In another aspect, the invention provides a wall assembly comprising, consisting of, or consisting essentially of two adjacent boards, joined by a seam. Only one-coat of the joint compound is applied over the seam to provide a uniform aesthetic appearance. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi, as measured according to ASTM D3102-78. The wall assembly further comprises dimensionally stable, non-swelling flat joint tape embedded in the seam.

In another aspect, the invention provides a method of treating a wallboard assembly of two adjacent boards joined by a seam. The method comprises, consists of, or consists essentially of applying joint tape and one coat of the joint compound composition to the seam. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi, as measured according to ASTM D3102-78. The method further comprises drying the composition.

In another aspect, the invention provides a reinforcement trim for protecting a seam of two adjacent boards having opposing face and back surfaces, the faces being disposed with respect to each other at an angle between the board faces. The trim comprises, consists of, or consists essentially of paper face comprising non-swelling synthetic paper facing material; and a backing. For example, the facing material can be laminated to a sturdy, rust-resistant material designed to impart superior long term corner angle joint reinforcement that exceeds the minimum performance requirements established in ASTM-1047-10a (Standard Specification for Accessories for Gypsum Wallboard and Gypsum Veneer Base) for crack resistance and chipping, resulting in corner vertex that remains straight during normal building movement and/or displacement, and daily wear-and-tear. In some embodiments, the backing comprises metal such as galvanized steel, and/or other backing material having the aforesaid desired properties, including, for example, composite laminate structure, layered paper, thermoplastic, thermoset, carbon fiber, polyester, polycarbonate, spun polyolefin, natural or synthetic fiber, woven material, and the like.

BRIEF DESCRIPTION OF THE SEVERAL VIEWS OF THE DRAWING(S)

FIGS. 2A-2B are alternative sectional views taken substantially from the line 2-2 of FIG. 1, wherein FIG. 2A illustrates a conventional taper for comparative purposes, while FIG. 2B illustrates a shallower taper in accordance with embodiments of the invention.

FIGS. 3A-3B are alternative sectional views of a finished joint of two wallboards with tapered edges abutting, wherein FIG. 3A illustrates a joint with conventional wide feathering of joint compound for comparative purposes, while FIG. 3B illustrates narrower feathering of joint compound, closer to the plane of the board, in accordance with embodiments of the invention.

FIGS. 3C-3D are alternative sectional views of a finished joint of two wallboards with square (i.e., non tapered) edges abutting, wherein FIG. 3C illustrates a conventional joint with wide feathering of joint compound for comparative purposes, while FIG. 3D illustrates narrower feathering of joint compound, closer to the plane of the board, in accordance with embodiments of the invention.

FIGS. 4A and 4B are exploded perspective views depicting reinforcement trim to be applied to a corner formed from two wallboards, wherein FIG. 4A shows an outside corner with angle (x), while FIG. 4B shows an inside corner with angle (y).

FIG. 7 illustrates a finished room installation after painting.

FIG. 8 depicts corner reinforcement trims in accordance with embodiments of the invention.

DETAILED DESCRIPTION OF THE INVENTION

Figure 1:
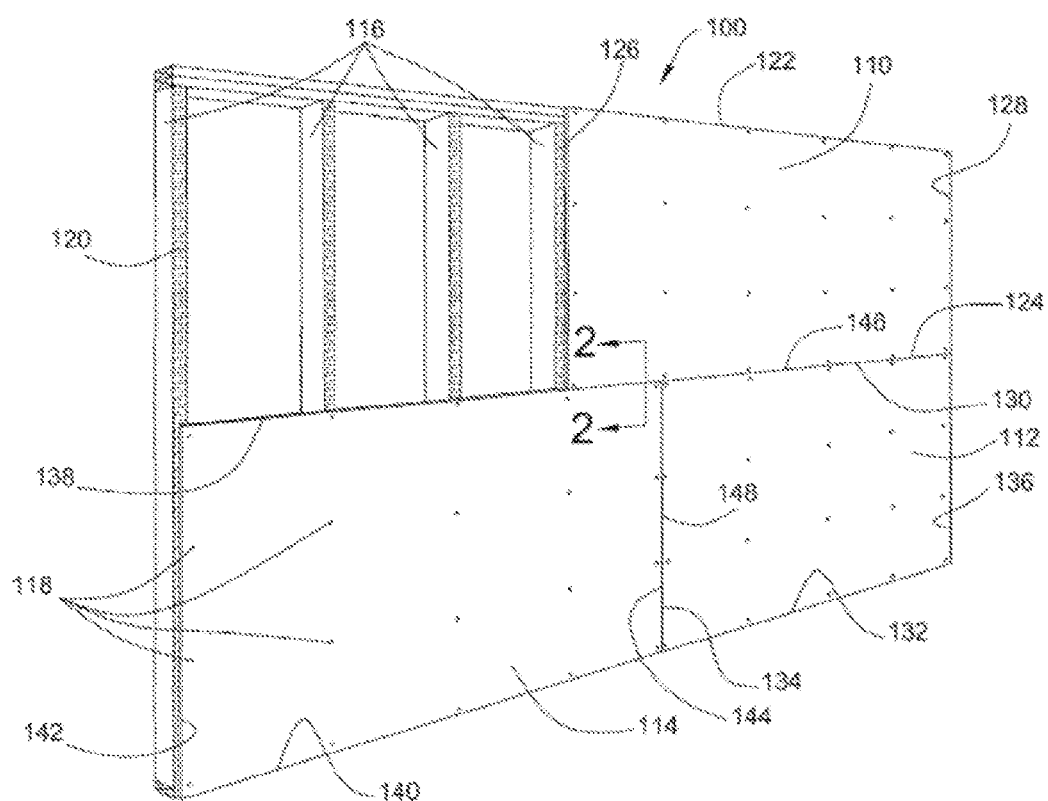
FIG. 1 is a perspective view of a wall assembly.

In various embodiments, the present invention relates to joint compound compositions, board finishing systems, wall assemblies, methods of treating walls, and products related to any of the foregoing, including reinforcement trim, e.g., for protecting corners where boards meet, fastener, and tape. Various aspects of the invention advantageously impart considerable efficiencies in the finishing of wall assemblies comprising cladding such as gypsum drywall, mat-faced board (e.g., having fiberglass facing), and the like. For example, the present invention allows for wall finishing to take place with significantly less steps required for any given desired finish level, e.g., a level 4 finish in accordance with Gypsum Association document GA-214 and/or ASTM C840 ("level 4"). As a result, wall finishing can occur more rapidly, with less downtime. In addition, wall finishing in accordance with aspects of the invention requires less skill by users during cladding installation.

One aspect of the invention is predicated, at least in part, on the surprising and unexpected discovery of joint compound composition that exhibits low shrinkage. As a result, the joint compound advantageously can be applied in fewer coats than conventional joint compounds. In some embodiments, only one coat of joint compound is used over fasteners, joint tape or reinforcement trim. For example, conventional systems suffer from significant shrinkage, such as, for example, exceeding 15%, e.g., about 18% or greater. Embodiments of the invention provide considerably less shrinkage. Embodiments of joint compound also exhibit desirable flexibility properties and can be sanded readily and desirably do not crack.

Because the joint compound composition can be applied in fewer coats, advantageously, a user can manipulate the joint compound closer to the plane of the board. Conventionally, in multi-coat (e.g., 3 coats or more) systems, the user must broadly feather the joint compound across a wide radius from the seam to provide a visual illusion of a flat surface. Significant skill is required for the user to achieve such appearance when the joint compound thickness elevates significantly above the plane of board and board seams. By using a one-coat joint compound in accordance with embodiments of the invention, a user will not need to feather the joint compound as widely and less skill is necessary to achieve a flat visual appearance. In some embodiments, board is specially designed to have a smaller taper than conventional board, or no taper at all (i.e., squared edge) in the machine direction edges, as described herein.

In other aspects, the invention provides for a special non-swellable material that can be used in joint tape, as well as for a face layer in reinforcement trim composite used to conceal and protect wall corners where two boards meet at an angle (e.g., an "inside" corner or "outside" corner as understood in the art). The trim can also include a backing (e.g., comprising metal or other material) to provide rigidity and support.

Adhesive can be used in various aspects of the invention. In some embodiments, the adhesive is an aqueous quick-drying adhesive such as an aqueous wallcovering adhesive (e.g., such as those marketed by Roman Adhesives), an aqueous bonding agent (e.g., such as those marketed by United States Gypsum Company), aqueous latex emulsion glue (e.g., such as those marketing by OSI). For example, such adhesive can be applied to framing members to minimize the number of fasteners used to hang board. Adhesive can also be used to facilitate application of joint tape and reinforcement trim in accordance with embodiments of the invention.

A fastener in accordance with embodiments of the invention can be used to accommodate a single coat of joint compound. For example, the fastener can include a concave head design to create a dimpled effect, although other fasteners are possible, including staples or other drywall screws. One or more of these various aspects can be combined in a board finishing system in accordance with embodiments of the invention.

Reference is now made to the figures to depict advantageous illustrative embodiments of the invention. FIG. 1 depicts a wall assembly 100 comprising three boards 110, 112, and 114 which are affixed to framing members 116 by way of fasteners 118. Any suitable cladding can be used as the board. For example, gypsum board normally comprises a core comprising an interlocking matrix of crystalline gypsum with desired additives such as polyphosphate, starch, dispersant, accelerator, retarder, etc., between two cover sheets in a sandwich structure. The core can optionally comprise a skim coat disposed on a core surface facing one or both cover sheets. The invention is not limited with respect to the techniques for manufacturing the cladding, and the board can be made in any suitable manner as known in the art.

The framing members 116 are desirably provided with adhesive 120 to promote adhesion to the boards 110, 112, and 114 and to allow the use of fewer fasteners 118 than are used in conventional systems. Since fasteners need to be covered by joint compound, reducing the number of fasteners is thereby advantageous in terms of efficiency, ease, and quality of installation.

Board edges are generally identified as being in the machine direction or cross direction based on how the board is made on the manufacturing line. Edges along the machine direction are normally the longer edges and are usually wrapped with cover sheet (e.g., made of paper) during board manufacture in which a cementitious slurry is deposited on a moving cover sheet (e.g., on a conveyor) to initially form a long, continuous ribbon of board precursor which is eventually cut in the cross direction to desired dimensions as known in the art (e.g., 4'×8'; 4'×10'; 4'×12'; etc, although different widths and lengths are possible, including 36 inch wide board, or 54 inch wide board). For example, board 110 has machine direction edges 122 and 124 and cross-machine edges 126 and 128. Similarly, board 112 has machine direction edges 130 and 132 and cross-machine edges 134 and 136, while board 114 has machine direction edges 138 and 140 and cross-machine edges 142 and 144. As discussed in FIGS. 2A and 2B below, the machine edges are typically tapered. The cut cross-machine edges are normally not tapered.

Two boards can meet in various configurations to form a seam, often referred to as a joint. Since machine edges are tapered while cross machine joints are not tapered, the nature of the joints will vary depending on which edges of the boards meet. When a machine direction edge of one board meets a machine direction board of another board, a machine direction joint is formed where two tapers meet to form a recess. When a cross direction edge of one board meets a cross direction edge of another board, a butt joint, without tapers, is formed. As seen in FIG. 1, boards 110 and 112 join to form a machine direction joint 146, and boards 112 and 114 join to form a butt joint 148.

Figure 2A:
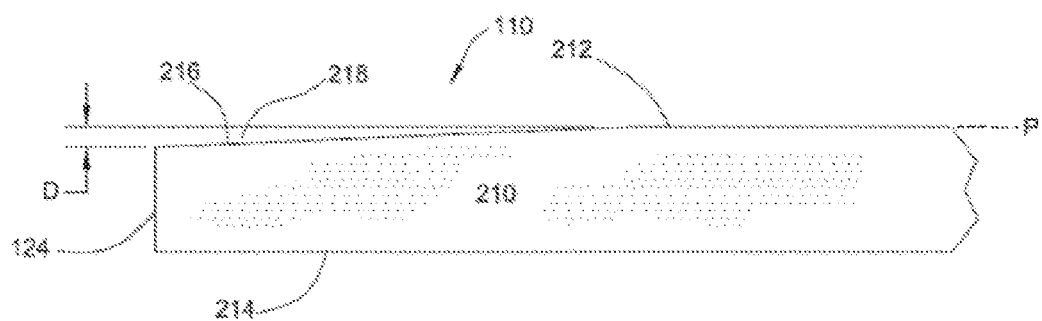
Figure 2B:
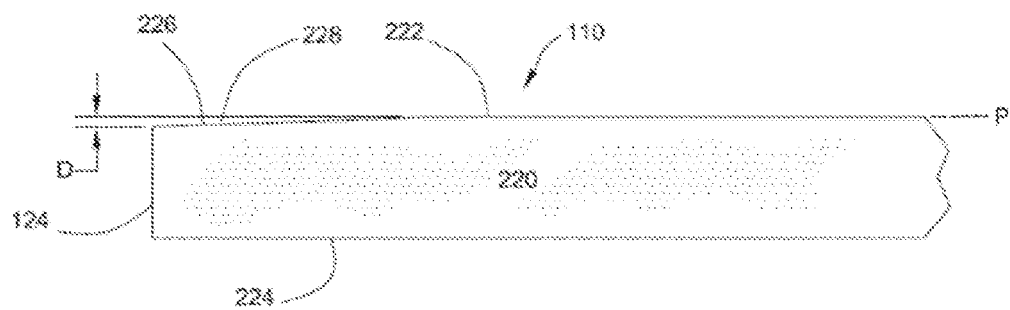

To illustrate the tapered edges in the machine direction of board, reference is made to FIGS. 2A and 2B which are sectional views illustrating alternate depths for the taper from board 110. A board core 210 has a top surface 212 and bottom surface 214. Normally a top cover sheet facing top surface 212 wraps around machine edge 124 and meets a bottom paper which faces bottom surface 214. It will be understood that the sandwich structure of board 110 with core 210 between two cover sheets is typically formed upside down such that the top surface 212 is on the bottom. If desired, during manufacture, the board can be flipped prior to entry into a kiln for drying excess water. The core 210 can optionally comprise skim coats as known in the art, e.g., on top surface 212 and/or bottom surface 214.

FIG. 2A shows a conventional taper 216 with a significant depth (D) for thereby defining a recess 218. Since conventional joint compound is susceptible to significant shrinkage, the depth (D) is large to accommodate receiving copious amounts of joint compound in recess 218 for embedding joint tape therein to compensate for the shrinkage upon drying. The taper with substantial depth (D) is further designed to assist the user by reducing the height above the plane of the board in which additional coats of joint compound are manipulated in conventional systems. For example, conventional tapers can define a recess depth of about 0.08 inch at the deepest point. Even with such conventional depth (D) on the taper, the user must still undesirably manipulate joint compound considerably high above the plane of the board.

FIG. 2B illustrates an alternate taper in accordance with embodiments of the invention. A board core 220 has a top surface 222 and bottom surface 224. Normally a top cover sheet facing top surface 222 wraps around machine edge 124 and meets a bottom paper which faces bottom surface 224. The core 220 can optionally comprise skim coats as known in the art, e.g., on top surface 222 and/or bottom surface 224. During manufacture, the board can be formed upside down initially and flipped as desired as described above.

As seen in FIG. 2B, the taper 226 has a depth (D) that is considerably smaller than what is conventional, as shown in FIG. 2A. Such a taper 226 defines a recess 228 which is smaller than conventional and is particularly useful with low shrinkage joint compound in accordance with embodiments of the invention. In some embodiments, no taper is provided even in the machine direction such that the board has a square edge (i.e., D=zero). Thus, since no taper is possible, in various embodiments, the taper 226 can define a recess depth at the deepest point from about 0 inch to about 0.05 inch, e.g., from about 0 inch to about 0.04 inch, 0 inch to about 0.03 inch, 0 inch to about 0.02 inch, 0 inch to about 0.015 inch, 0.005 inch to about 0.05 inch, 0.005 inch to about 0.04 inch, 0.005 inch to about 0.03 inch, 0.005 inch to about 0.02 inch, 0.005 inch to about 0.0.015 inch, 0.01 inch to about 0.05 inch, 0.01 inch to about 0.04 inch, 0.01 inch to about 0.03 inch, 0.01 inch to about 0.02 inch etc.

Figure 3A:
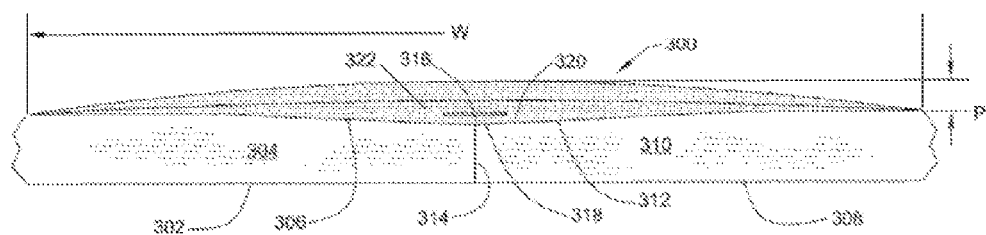
Figure 3B:
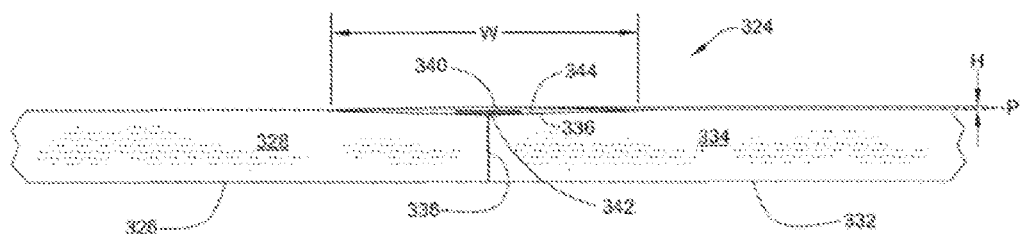
Figure 3C:
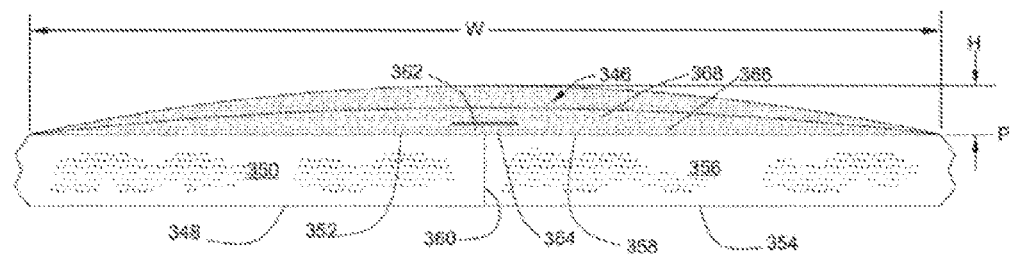
Figure 3D:
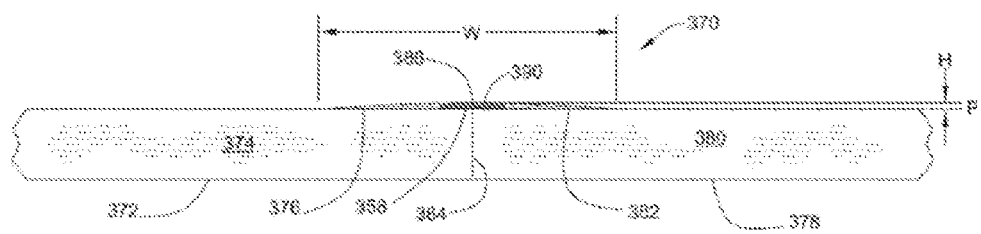

FIGS. 3A-3D are sectional views illustrating different arrangements for level 4 finishing of a joint between two wallboards. Particularly, FIGS. 3A and 3B illustrate a joint between two tapered boards (e.g., boards adjoining along machine direction) where FIG. 3A illustrates a conventional system with multiple coats of joint compound for comparative purposes, and FIG. 3B illustrates one coat of joint compound in accordance with embodiments of the invention. FIGS. 3C and 3D illustrate a joint where two square edges meet without taper (e.g., in a butt joint or machine direction joint without taper). In this respect, FIG. 3C illustrates a conventional multi-coat system for comparative purposes while FIG. 3D illustrates application of one coat of joint compound in accordance with embodiments of the invention. While board cores are shown, it will be understood that cover sheets can be applied as described above.

In FIG. 3A, a board assembly 300 comprises a first board 302 having a core 304 and a tapered edge 306. A second board 308 comprises a core 310 and tapered edge 312. Tapered edges 306 and 312 meet to form a tapered joint 314. Tape 316 is applied over joint 314. Conventional systems require a joint compound layer 318 for embedding tape 316 over joint 314. Conventional dispensing tools can be used to dispense tape 316 and joint compound layer 318 together. After allowing joint compound layer 318 to dry, a joint compound second layer 320 is applied over the tape 316. Then, after the second layer 320 dries, a joint compound third layer 322 is applied over second layer 320. The three layers of joint compound 318, 320, and 322 are required in conventional systems to compensate for the significant shrinkage resulting from conventional joint compound chemistry.

FIG. 3B depicts a one-coat system in accordance with illustrative embodiments of the invention. A board assembly 324 comprises a first board 326 having a core 328 and tapered edge 330. A second board 332 comprises a core 334 and tapered edge 336. It will be understood that the tapered edges 330 and 336 both can have a smaller slope than conventional tapered edges 306 and 312 depicted in FIG. 3A and as described in relation to FIG. 2B above. Tapered edges 306 and 312 meet to form a tapered joint 338. Tape 340 can be applied over joint 338 by way of adhesive 342. The adhesive 342 can be in any suitable arrangement relative to tape 340, but in some embodiments the adhesive is on a bottom surface of the tape 340 and is optionally protected by adhesive liner. The adhesive can be any suitable adhesive, e.g., applied by pressure (such as by hand, knife, roller or other device). Unlike the conventional arrangement illustrated in FIG. 3A, only one joint compound layer 344 is required as shown in FIG. 3B.

FIGS. 3C-3D illustrate alternate embodiments for a square edged joint (i.e., without taper) as might be used in a butt joint or square edged machine direction joint. In FIG. 3C, a board assembly 346 comprises a first board 348 having a core 350 and a straight edge 352. A second board 354 comprises a core 356 and straight edge 358. Straight edges 352 and 358 meet to form a square edged joint 360. Tape 362 is applied over joint 360. Conventional systems require a joint compound layer 364 for embedding tape 362 over joint 360. As noted above, conventional dispensing tools can be used to dispense tape 362 and joint compound layer 364 together. After allowing joint compound layer 364 to dry, a joint compound second layer 366 is applied over the tape 362. Then, after the second layer 366 dries, a joint compound third layer 368 is applied over second layer 366. The three layers of joint compound 318, 320, and 322 compensate for the significant shrinkage in conventional joint compounds.

FIG. 3D depicts a one-coat system for square joint in accordance with illustrative embodiments of the invention. A board assembly 370 comprises a first board 372 having a core 374 and straight edge 376. A second board 378 comprises a core 380 and straight edge 382. Straight edges 376 and 382 meet to form a square edge joint 384. Tape 386 can be applied over joint 384 by way of adhesive 388. The adhesive 388 can be in any suitable arrangement relative to tape 386, but in some embodiments the adhesive is on a bottom surface of the tape 386 and is optionally protected by adhesive liner. The adhesive can be any suitable adhesive, e.g., applied by pressure. Unlike the conventional arrangement illustrated in FIG. 3C, only one joint compound layer 390 is required as shown in FIG. 3D.

Conventional systems, as shown in FIGS. 3A and 3C, require the three layers of joint compound (318, 320, and 322) and (364, 366 and 368) which results in the user having to manipulate the joint compound significantly above the plane (P) of the board at a height (H) as shown. The height (H) is even more extreme in squared edged embodiments (as are typical with respect to butt joints) such as shown in FIG. 3C inasmuch as there is no taper below the plane (P) of the board to receive some compound. For example, the height (H) of conventional systems can be, for example, at least about 0.1 inch, e.g., at least about 0.125 inch or higher. The user must have significant skill to manipulate the compound to appear flat to the naked eye when functioning that high above the plane of the board. Typically, the joint compound is progressively feathered further and further away from the joint 314 or 360, respectively. Because of the significant height (H), the feathering is at a substantial width (W) as shown to give the visual appearance of a flat covered joint. For example, the width (W) of conventional embodiments as shown in FIGS. 3A and 3C can be at least about 30 inches, e.g., about 36 inches or more, in conventional systems.

The inventive embodiments illustrated in FIGS. 3B and 3D advantageously result in smaller height (H) and width (W) for depositing and feathering the joint compound as compared with the (H) and (W) for the corresponding conventional arrangements set forth in FIGS. 3A and 3C, respectively. This is because the user is not required to function as high above the plane (P) of the board and thusly does not need to feather the compound layer 344 and 390, respectively, as far wide as in the conventional systems of FIGS. 3A and 3C. For example, the height (H) in some inventive embodiments can be under 0.1 inch, and preferably the height (H) is under 0.7 inch, such as about 0.0625 inch or less or about 0.05 inch or less (e.g., 0.02 inch to about 0.1 inch, 0.02 inch to about 0.07 inch, 0.02 inch to about 0.0625 inch, about 0.02 inch to about 0.05 inch, about 0.05 inch to about 0.1 inch, about 0.05 inch to about 0.07 inch, about 0.05 inch to about 0.0625 inch, etc). Similarly, the width (W) of embodiments of FIGS. 3B and 3D for feathering the joint compound 344 and 390, respectively, can be considerably smaller than the width (W) of corresponding conventional systems (e.g., as shown in FIGS. 3A and 3C). For example, the smaller width (W) of advantageous embodiments of the invention can be about 20 inches or smaller, such as about 18 inches or smaller, 15 inches or smaller, 12 inches or smaller (e.g., about 5 inches to about 20 inches, about 5 inches to about 15 inches, about 5 inches to about 12 inches, about 5 inches to about 10 inches, etc).

Figure 4A:
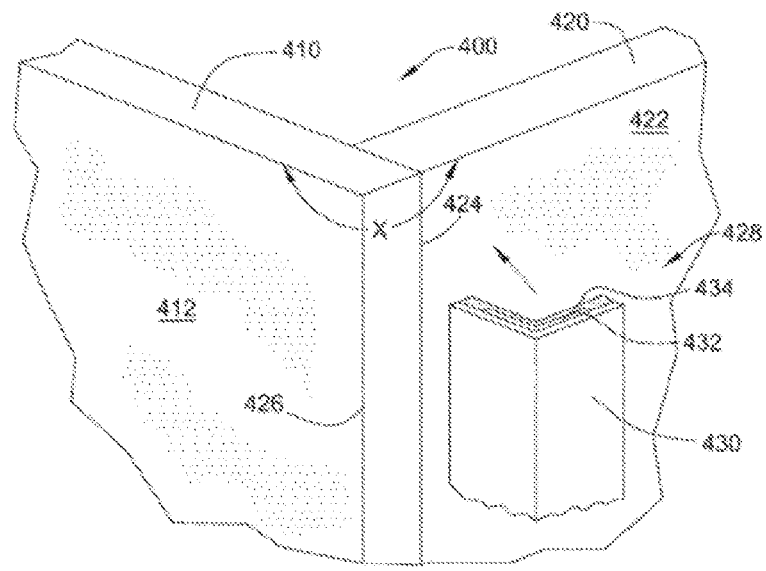
Figure 4B:
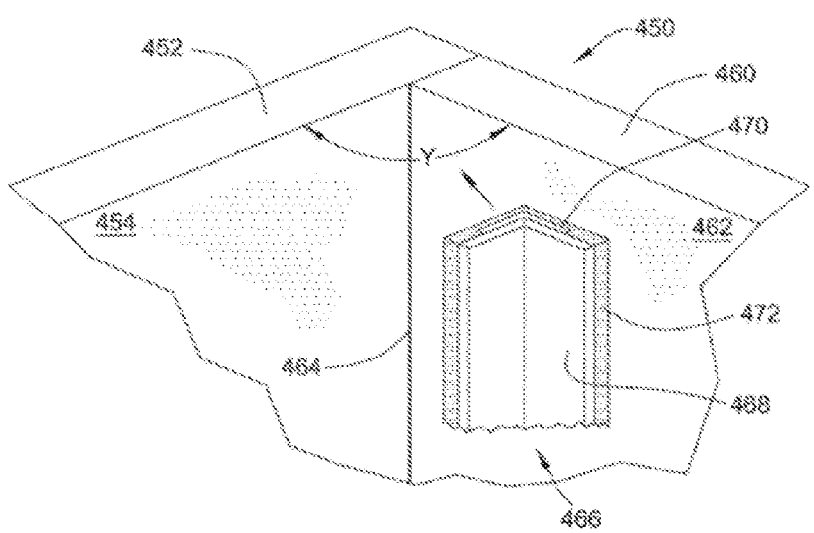

FIGS. 4A and 4B depict illustrative embodiments for treating seams where boards meet at an angle, e.g., to form a wall corner. Corner angle reinforcement trim can define and reinforce the corner angles, provide continuity between intersecting gypsum board planes, and conceal gypsum panel corner seams when covered with compound. For example, to illustrate an outside corner, FIG. 4A depicts a wall assembly 400 comprising a first board 410 having a face 412. A second board 420 has face 422. The boards 410 and 420 meet at an angle to form a corner seam 424 adjacent to a face edge 426 of board 410. The angle (x) is defined by the intersection of the faces 412 and 422 in what is understood in the art as an outside angle forming an outside corner. The outside angle can be any suitable angle depending on the wall configuration and dimensions as understood in the art. Typically, the angle (x) is a reflex angle as shown in FIG. 4A, i.e., an angle exceeding 180°, although smaller angles are possible in more unique corners. For example, in some embodiments, the angle (x) can be in a range of, e.g., from about 180° to about 300°, including angles near 270°, such as from about 230° to about 330°, from about 250° to about 310°, about 260° to about 300°, about 260° to about 280°, about 265° to about 275°, or about 268° to about 272°.

As seen in exploded view of FIG. 4A, a reinforcement trim 428 is applied over the outside corner seam 424 and face edge 426 to cover and protect the edge 426 and seam 424. Trim 428 comprises a trim face 430 with reinforcement backing 432, which has a width that does not extend as far as the width of the trim face 430 in some embodiments. Adhesive 434 is used to apply the trim 428 over the outside corner seam 424 and face edge 426. Joint compound, including one coat joint compound in accordance with embodiments of the invention, is applied over the trim to hide the trim and seam. After it is applied and dried, the compound can be sanded and painted to provide a uniform aesthetic appearance.

To illustrate an inside corner, FIG. 4B depicts a wall assembly 450 comprising a first board 452 having a face 454. A second board 460 has face 462. The boards 452 and 460 meet at an angle to form a corner seam 464. The angle (y) is defined by the intersection of the faces 454 and 462 in what is understood in the art as an inside angle forming an inside corner. The inside angle can be any suitable angle depending on the wall configuration and dimensions as understood in the art. Typically, the angle (y) is an angle below 180°, although larger angles are possible in more unique corners. For example, in some embodiments, the angle (y) can be in a range of e.g., about 30° to about 180° or from about 45° to about 135°, including angles near 90°, such as from about 60° to about 120°, about 70° to about 110°, about 80° to about 100°, about 85° to about 95°, or about 88° to about 92°.

As seen in exploded view of FIG. 4B, a reinforcement trim 466 is applied over the inside corner seam 464 to cover and protect the seam 464. Trim 466 comprises a trim face 468 with reinforcement backing 470, which has a width that does not extend as far as the width of the trim face 468 in some embodiments. Adhesive 472 is used to apply the trim 466 over the seam 464. Joint compound, including one coat joint compound in accordance with embodiments of the invention, is applied over the trim to hide the trim and seam. After it is applied and dried, the compound can be sanded and painted to provide a uniform aesthetic appearance.

The trim face 430 or 468 desirably comprises non-swelling paper (natural or synthetic) in some embodiments. The non-swelling paper is particularly desirable in one coat systems since less compound will go over the paper and disguise any unwanted swelling that might lead to bulging or other unsightly results. For example, in some embodiments, the face 430 or 468 has a dimensional stability of less than about 0.4% machine direction (MD) expansion, and less than about 2.5% cross machine direction (CD) expansion (e.g., less than about 0.3% MD expansion, and less than about 1.5% CD expansion, such as less than about 0.2% MD expansion, and less than about 1% CD expansion after 30 minute immersion in water, ASTM C474-05, Section 12. It will be understood that embodiments that pass testing relative to ASTM C474-05 can also exceed the minimum performance specifications established in ASTM C475/C475M-12 Standard Specification for Joint Compound and Joint Tape for Finishing Gypsum Board.

In some embodiments, the face 430 or 468 has a thickness from about 0.01 inches ($\approx$0.0254 cm) to about 0.125 inches ($\approx$0.318 cm), such as from about 0.05 inches ($\approx$0.127 cm) to about 0.0625 ($\approx$159 cm), It will be understood that the joint tape can be composed of the same materials, characteristics, and properties as the reinforcement trim face.

The backing 432 or 470 for the reinforcement trim 428 or 466 can comprise any suitable material that provides strength to the trim composite. The backing material is useful to reduce, control, or eliminate seam cracking in the wall angles when new construction framing shifts and minor wall displacement occurs. The backing material also, in conjunction with the facing material, serves the function of forming a true and straight angle line along the vertex where two walls join or intersect at an angle. For example, the trim backing 432 or 470 can comprise a composite laminated structure, layered paper (synthetic or natural), thermoplastic, thermoset, natural or synthetic fiber, carbon fiber, polyester, polycarbonate, fiberglass, non-woven natural or synthetic materials, woven natural or synthetic materials, spun polyolefin, or metals such as steel, e.g., electro-galvanized and/or hot dipped galvanized, zinc phosphate treated and/or dried in place chromate sealer, and/or other treated or coated metal and the like. For example, in one illustrative embodiment, the backing 432 or 470 is formed of galvanized steel. The trim backing 432 or 470 desirably has any suitable thickness, e.g., a thickness of at least about 0.010, e.g., about 0.012 inches ($\approx$0.030 cm) to about 0.0625 inches ($\approx$0.159 cm), such as from about 0.012 inches to about 0.030 inches ($\approx$0.0762 cm). In some embodiments of backing material, such as when galvanized steel is used, the backing typically imparts a rockwell hardness scale B from about 45 to about 85, such as from about 55 to about 65, when measured according to ASTM E18-03.

Preparation of trims is illustrated in embodiments with non-swellable paper face with galvanized steel backing. The trims are prepared by running flat steel (on a spool) through a series of progressive dies and the facing material and metal backing are introduced just after the last set of dies. The facing and backing can be hot-melt glued together in some embodiments. Other techniques for forming reinforcement trims formed from a variety of materials will be apparent to one of skill in the art.

Figure 5:
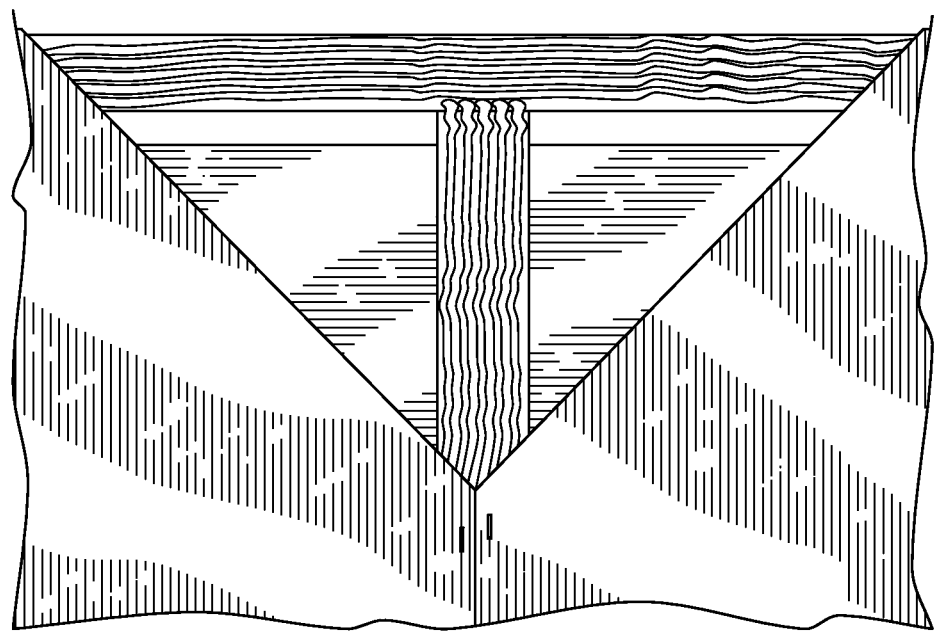
FIG. 5 illustrates two adjoining boards affixed to a framing skeleton, wherein the V-shaped cut away shows the presence of adhesive on framing members in accordance with embodiments of the invention.
Figure 6:
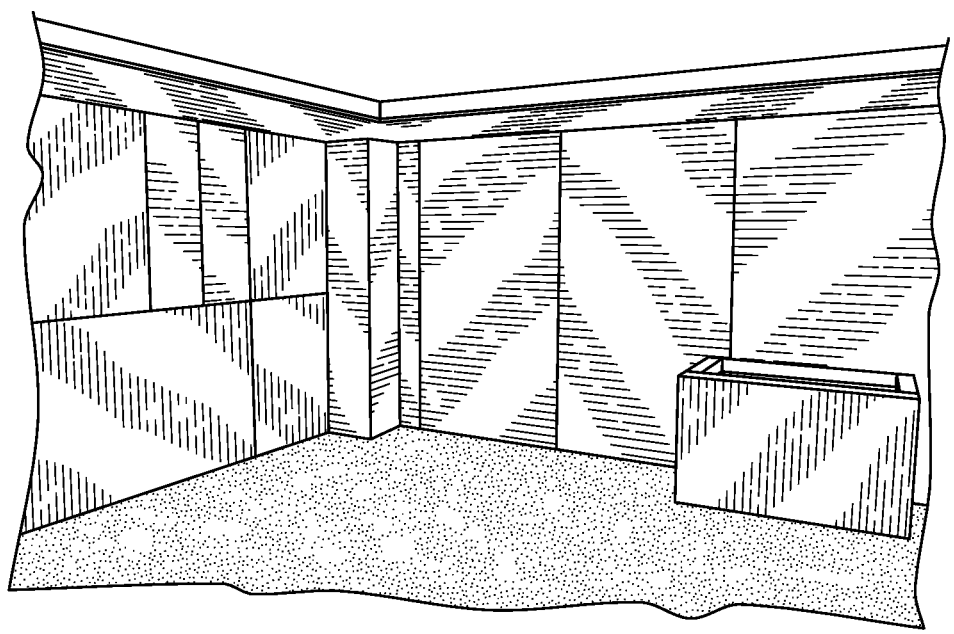
FIGS. 6-7 illustrate installations of wall assemblies, where
Figure 7:
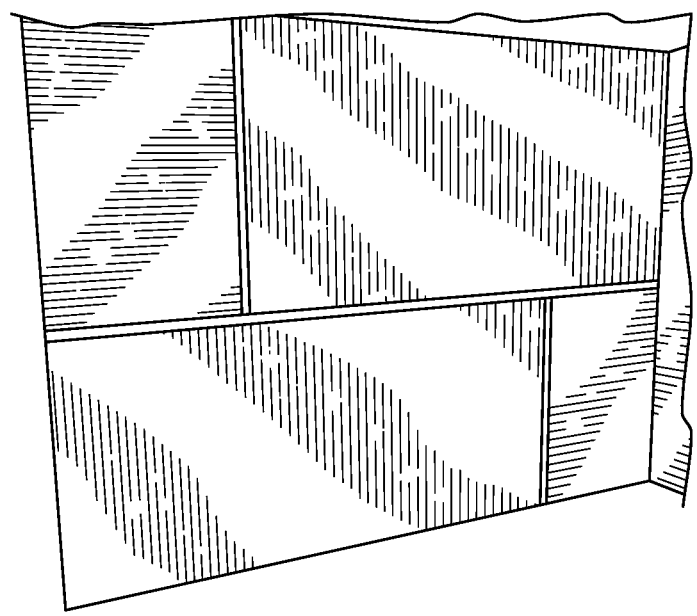

FIGS. 5-18 are photographic images depicting various illustrative embodiments of the invention. In particular, FIG. 5 shows a cut away of board to reveal panel adhesive applied to framing. FIG. 6 depicts a room installation after painting. As seen in FIG. 6, a finished wall installation in accordance with embodiments of the invention can achieve a level 4 drywall finish with one coat of joint compound and without the need for multiple coats of joint compound as in conventional systems. In addition, FIG. 7 depicts joint tape that has been adhesively applied over the seams of gypsum panels before the gypsum panels are treated with joint compound.

Figure 8:
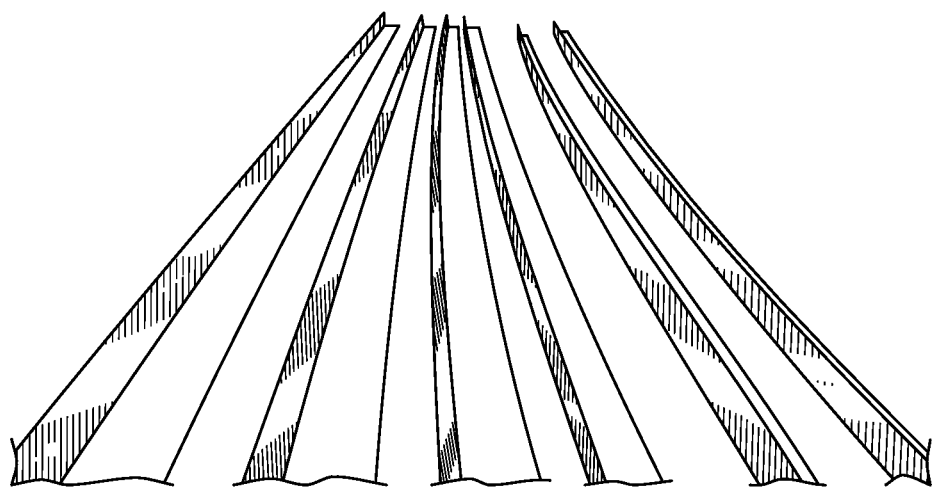
FIG. 8 illustrates taped joints prior to depositing joint compound.
Figure 9:
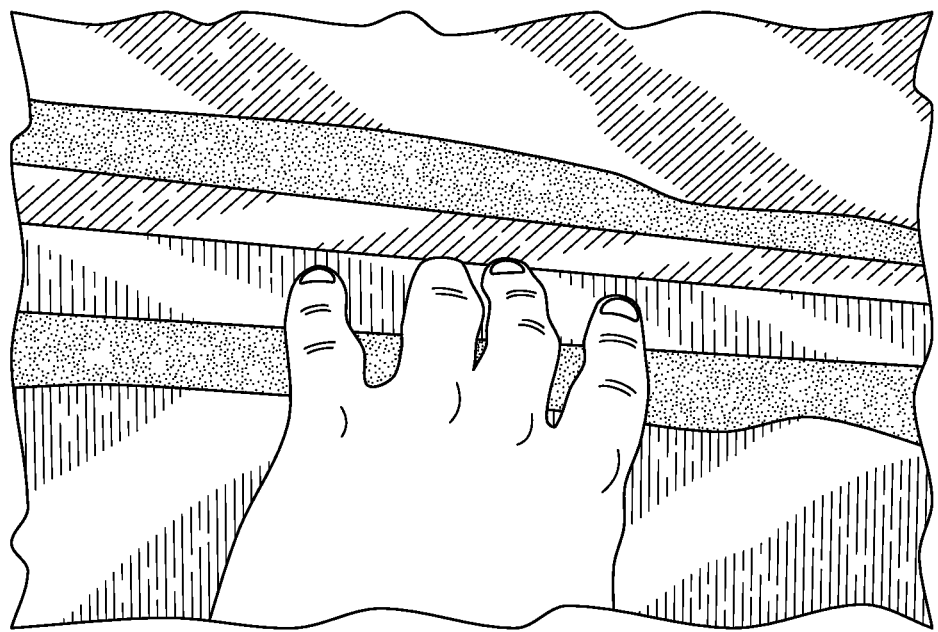
FIG. 9 depicts corner reinforcement trim being affixed to an inside corner with a pressure adhesive in accordance with embodiments of the invention.
Figure 10:
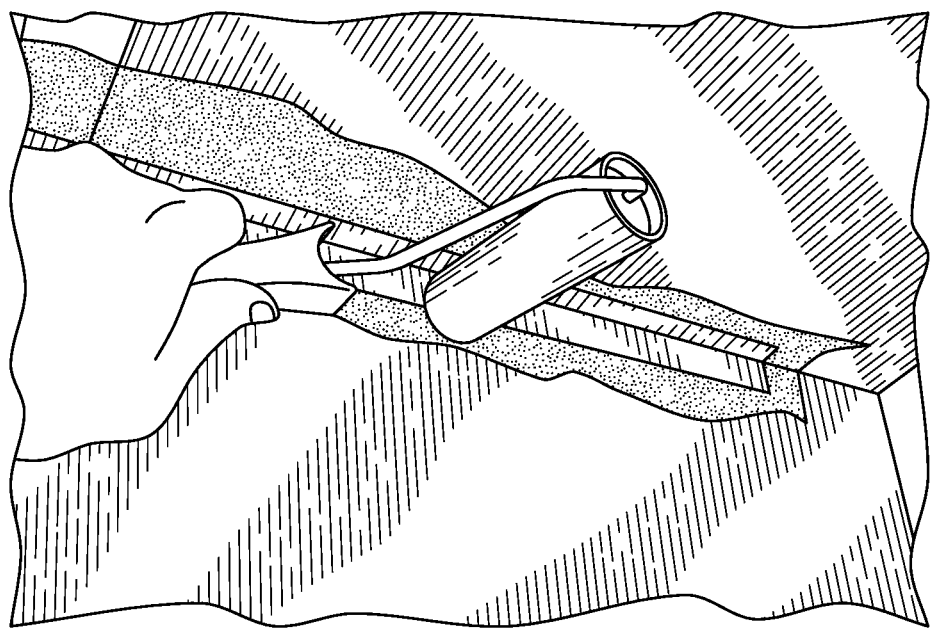
FIGS. 10-11 depict seating reinforcement trip into corners with a roller device in accordance with embodiments of the invention.
Figure 11:
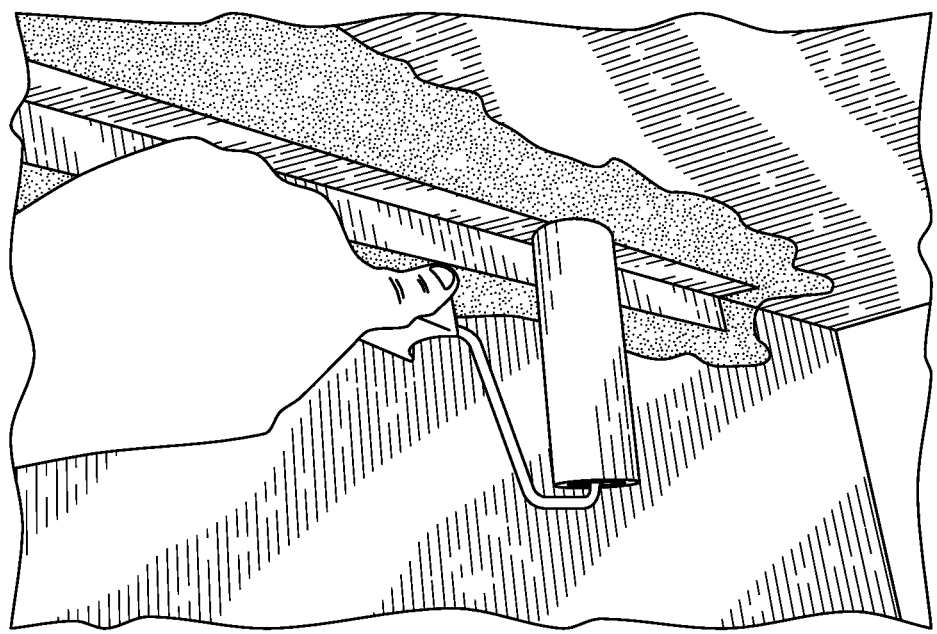
Figure 12:
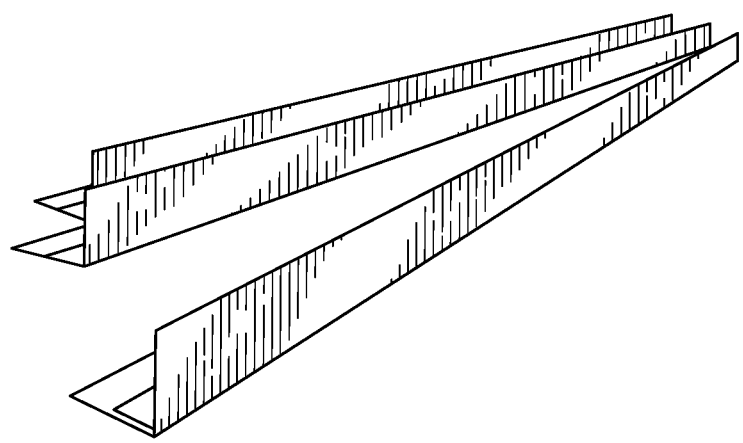
FIG. 12 depicts corner reinforcement trims in accordance with embodiments of the invention.
Figure 13:
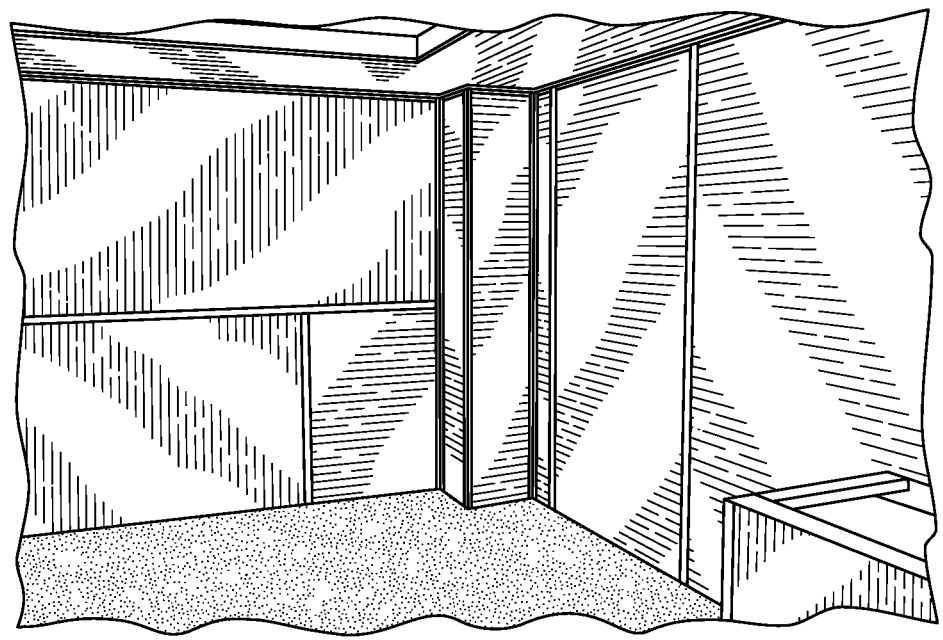
FIG. 13 depicts wall assemblies showing corner reinforcement trims installed on inside and outside corners in accordance with embodiments of the invention.
Figure 14:
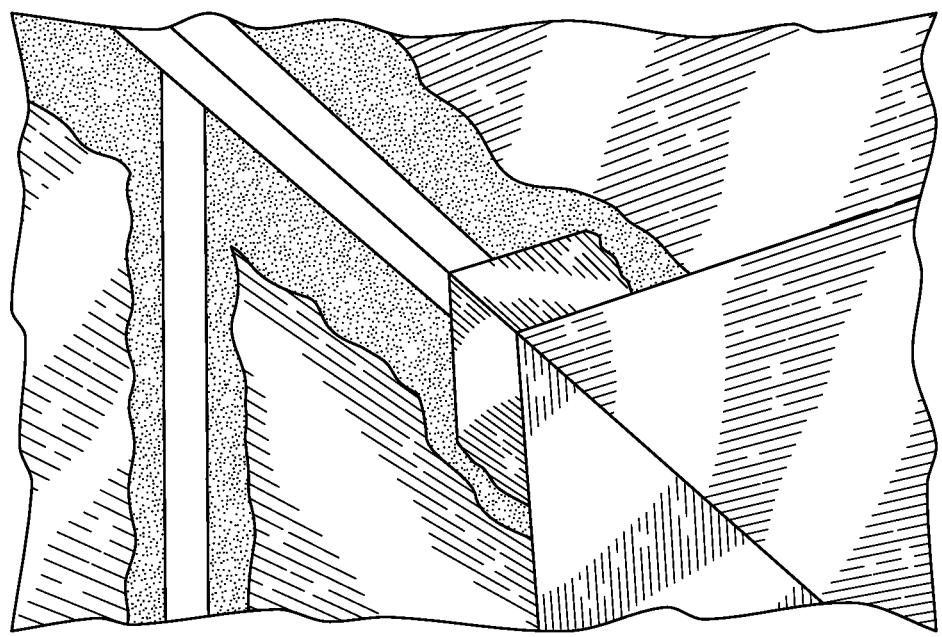
FIG. 14 depicts a reinforcement trim for an inside corner with one coat of joint compound in accordance with embodiments of the invention.

With respect to inside and outside corner installation, FIG. 8 depicts outside corner trims that are fabricated with non-swellable paper face with metallic backing. Meanwhile, FIG. 9 depicts an inside corner reinforcement trim with non-swellable paper face and metal backing being hand pressed into place. FIGS. 10-11 depict application of trim embodiments of the invention using a roller. FIG. 12 depicts outside corner trim pieces. FIG. 13 depicts a room installation with all inside and outside corner trims and flat joint tape installed. FIG. 14 depicts flat joint tape on the inside corner trim on the upper left-hand corner of the image. The lower right-hand corner of the image depicts one coat of joint compound applied to provide a level 4 drywall finish, in accordance with embodiments of the invention.

Figure 15:
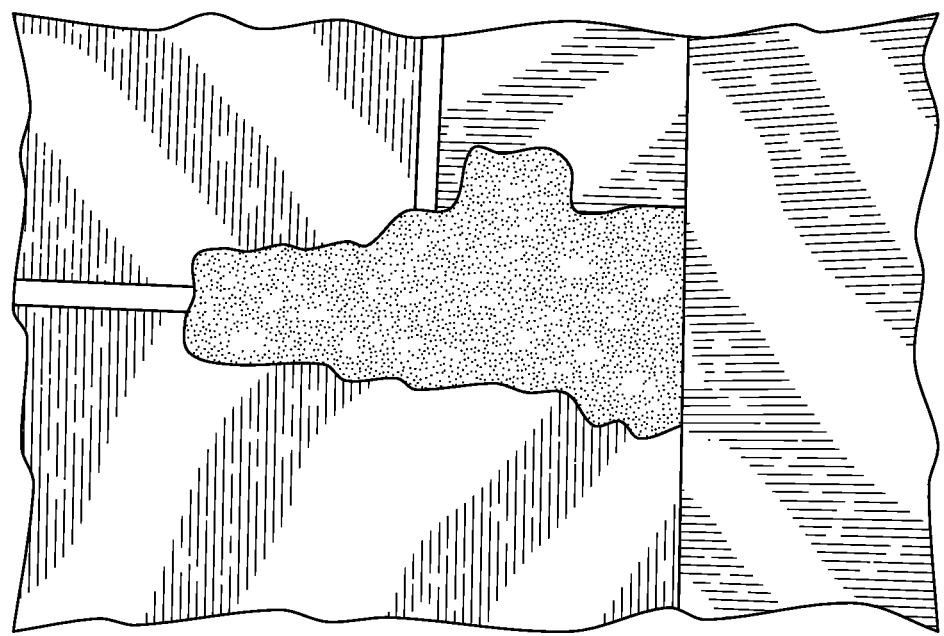
FIG. 15 depicts a sanded one-coat finish both for a joint in the machine (horizontal, as shown) direction and for a butt joint (vertical, as shown), in accordance with embodiments of the invention.
Figure 16:
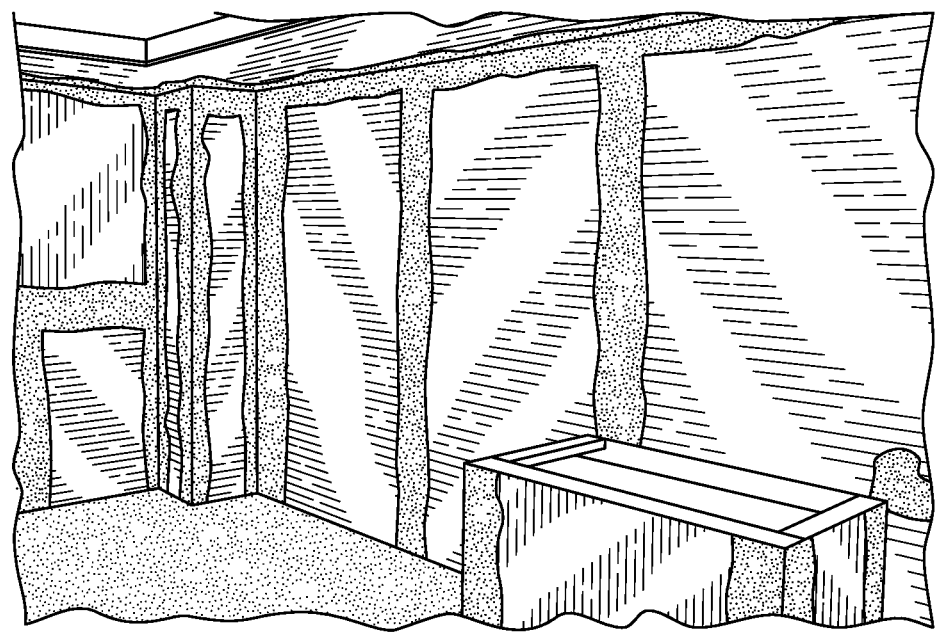
FIG. 16 depicts wall assembly installation with joint treatment applied.
Figure 17:
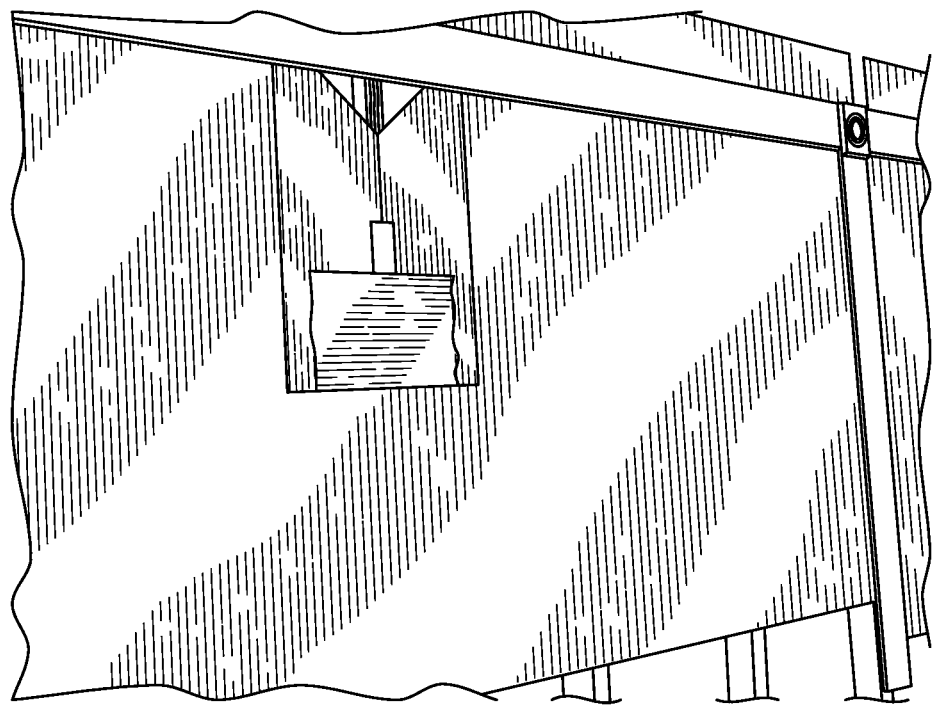
FIG. 17 depicts a treated wall assembly with a V cut to show framing member with adhesive and one coat of joint compound illustrating narrow feathering, in accordance with embodiments of the invention.
Figure 18:
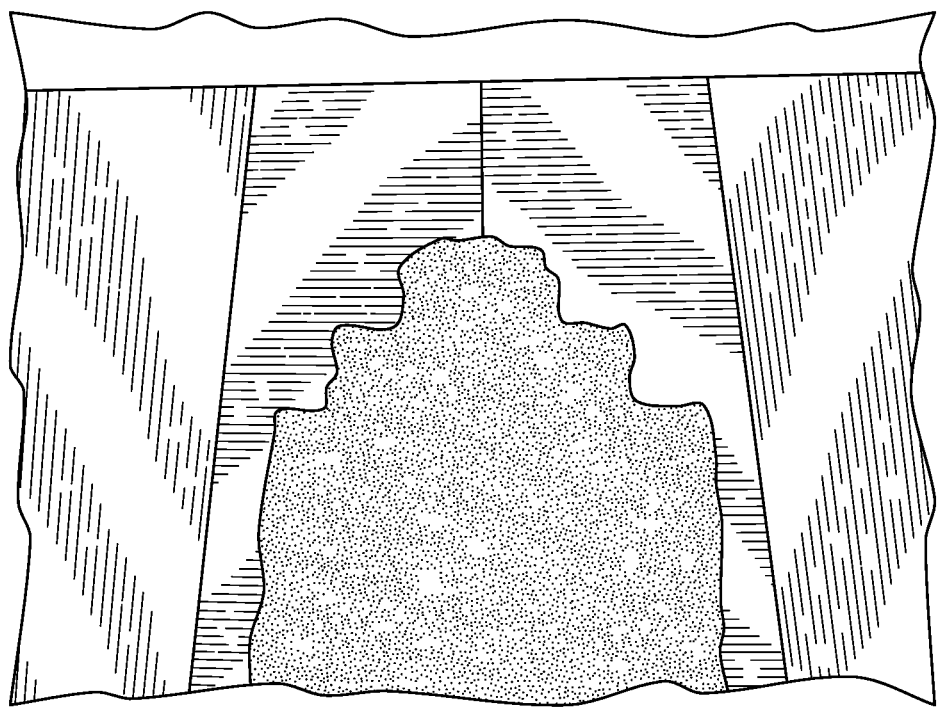
FIG. 18 depicts a conventional joint treatment system with joint tape embedded in joint compound with two additional joint compound applications over the tape requiring a wide feathering of the joint compound, for comparison purposes.

FIG. 15 depicts flat joint tape with one coat of joint compound applied on the left side of the image. It can be seen that a butt joint (cross machine joint) without taper has been concealed with application of one coat of joint compound and then sanding. The right side of the image depicts the finished painted look. FIG. 16 depicts a room installation with joint treatment installed, while FIG. 17 depicts a finished wall cut-away to reveal panel adhesive applied to framing with tape and one coat of joint treatment. Furthermore, FIG. 18 depicts a gypsum board with conventional level 4 drywall finish with only a 12 inch wide feathering in accordance with embodiments of the invention.

In these and other embodiments, joint compound composition in accordance with the present invention comprising (a) binder, (b) hollow spheres (sometimes referred to as bubbles) having an average isostatic crush strength of at least about 100 psi (e.g., at least about 250 psi), as measured according to ASTM D 3102-78, and optionally other ingredients. Preferably, the joint compound composition exhibits low shrinkage. For example, in some embodiments, the joint compound composition exhibits a shrinkage of about 10% or less by volume, e.g., about 7% or less, such as about 5% or less, about 2% or less, about 1% or less, about 0.1% or less, or about zero (no shrinkage), as measured by ASTM C474-05, Section 6.

The joint compound can have any suitable density, but preferably is an ultra lightweight composition, having a density of about 10 lb/gal or less, such as about 8 lb/gal or less. For example, in some embodiments, the joint compound has a density from about 2 lb/gal ($\approx$239.65 kg/m3) to about 8 lb/gal ($\approx$958.61 kg/m3) (preferably from about 2 lb/gal to about 6 lb/gal ($\approx$718.96 kg/m3), more preferably about 3 lb/gal ($\approx$359.48 kg/m3) to about 4 lb/gal ($\approx$479.31 kg/m3).

Generally, the composition is a drying type joint compound, wherein the compound hardens by evaporation of water. Thus, in some embodiments, the joint compound composition is substantially free of setting-type materials such as calcined gypsum, cement, or other hydraulically setting materials. Furthermore, the joint compound composition can desirably be substantially free of bulk filler, clays, starch, mica, or a combination thereof, such as, for example, calcium carbonate, expanded perlite, calcium magnesium carbonate, limestone, calcium sulfate dihydrate, attapulgite clay, kaolin clay, talcs, and diatomaceous earth and/or a combination thereof.

As used herein, "substantially free" of such setting minerals, bulk filler, clays, starch, mica, or a combination thereof means that the joint compound composition contains 0 wt. % based on the weight of the composition, or no such setting minerals, bulk filler, clays, starch, mica, or a combination thereof, or an ineffective or immaterial amount of such setting minerals, bulk filler, clays, starch, mica, or a combination thereof. An example of an ineffective amount is an amount below the threshold amount to achieve the intended purpose of using such setting minerals, bulk filler, clays, starch, mica, or a combination thereof, as one of ordinary skill in the art will appreciate. An immaterial amount may be, e.g., below about 5 wt. %, such as below about 2 wt. %, below about 1 wt. %, below about 0.5 wt. %, below about 0.2 wt. %, below about 0.1 wt. %, or below about 0.01 wt. %, as one of ordinary skill in the art will appreciate. However, if desired in alternative embodiments, such ingredients can be included in the joint compound composition.

Any suitable binder can be used to achieve desired joint compound in accordance with aspects of the invention. Desired binders hold particles in composition together and form a film. In some embodiments, the binder is selected from acrylic acid polymers, acrylic acid copolymers, alkyds, polyurethanes, polyesters, epoxies, and combinations thereof. The binder in some embodiments has a glass transition temperature (Tg) from about 32° F. ($\approx$0° C.) to about 70° F. ($\approx$21° C.), e.g., about 32° F. to about 66° F. ($\approx$18° C.), such as from about 40° F. ($\approx$5° C.) to about 60° F. ($\approx$15° C.), e.g., about 55° F. ($\approx$13° C.). In some embodiments, the binder has a minimum film forming temperature (MMFT) from about 32° F. to about 90° F. ($\approx$32° C.), e.g., from about 32° F. to about 86° F. ($\approx$30° C.), such as from about 40° F. ($\approx$5° C.) to about 60° F. ($\approx$15° C.), about 52° F. ($\approx$11° C.).

In some embodiments, the binder generally can be any suitable film-forming resin (or combinations thereof) capable of forming a solid film and binding solid materials to the surface to which the joint compound composition is applied. For example, the binder can be an acrylic acid polymer and/or acrylic acid copolymer in some embodiments. The binder is in the form of an aqueous emulsion in some embodiments, with suitable latex emulsion media including, but not limited to, acrylics, such as, for example, vinyl acrylics and styrenated acrylics. In some embodiments, suitable binder materials include acrylic latex, vinyl-acrylic, vinyl acetate, polyurethane, and/or combinations thereof.

Useful latex emulsion media include polyacrylate ester polymers marketed under the RHOPLEX® trade names (Rohm & Haas), acrylic polymers, vinyl acrylic polymers, for example, vinyl acetate-butyl acrylate copolymers, styrene acrylic polymers, and vinyl acetate polymers marketed under the UCAR™ and NEOCAR™ trade names (The Dow Chemical Company, Michigan) such as UCAR™ 367; emulsion polymers products marketed under the VINREZ® trade name (Halltech, Inc., Ontario); vinyl acrylic polymers marketed under the Plioway® trade name (Eliokem, Ohio);

acrylic, vinyl acrylic, and styrene acrylic latex polymers marketed under the AQUAMAC™ trade name (Resolution Specialty Materials, LLC, Illinois), vinyl acrylic resin marketed under the trade name VINREZ® 663 V15 (Halltech, Inc., Ontario), which has a glass temperature of about 18° C. Another vinyl acrylic copolymer binder is marketed under product identification no. HP-31-496 (Halltech, Inc., Ontario), and has a glass temperature of about 0° C.

Suitable functionalized acrylics, alkyds, polyurethanes, polyesters, and epoxies can be obtained from a number of commercial sources. Useful acrylics are sold under the ACRYLOID™ trade name (Rohm & Haas, Co., Pennsylvania); useful epoxy resins are sold under the EPON™ trade name (Resolution Specialty Materials, LLC, Illinois); useful polyester resins are sold under the CYPLEX® trade name (Cytec Industries, New Jersey); and useful vinyl resins are sold under the UCAR™ trade name (The Dow Chemical Company, Michigan).

The binder can be included in the joint compound composition in any suitable amount. For example, the binder can be included in an amount from about 5 wt. % to about 100 wt. % by weight (on a solids basis) of the wet composition, such as from about 20 wt. % to about 80 wt. %, from about 30 wt. % to about 70 wt. %, from about 40 wt. % to about 60 wt. %, etc.

The hollow spheres contain self contained air bound by solid barrier. Since the air is contained within a solid shell, the air does not coalesce such that, overall, the air can be distributed throughout the compound and maintain a substantially uniform density. The hollow spheres facilitate a lower density but desirably have good strength properties such that the hollow spheres impart crush resistance such that the dried joint compound, after application, is substantially non-friable in some embodiments, unlike conventional joint compound which is friable and brittle.

The spheres in some embodiments facilitate an ultra lightweight joint compound which results in desired properties and creates less strain on a user in lifting compound in pails, etc. during a work day. The spheres can have any suitable density, such as a density from about 0.0015 lb/in$^3$ to about 0.04 lb/in$^3$, e.g., from about 0.0018 lb/in$^3$ ($\approx$0.05 g/cm$^3$) to about 0.036 lb/in$^3$ ($\approx$1 g/cm$^3$), such as from about 0.0036 lb/in$^3$ ($\approx$0.1 g/cm$^3$) to about 0.0253 lb/in$^3$ ($\approx$0.7 g/cm$^3$). With respect to strength, for example, the spheres can have an average isostatic crush strength of at least about 50 psi ($\approx$340 kPa), as measured according to ASTM D 3102-78, such as an isostatic crush strength of at least about 100 psi ($\approx$690 kPa). For example, the isostatic strength of the spheres can be from about 50 psi to about 50,000 psi ($\approx$344,740 kPa), from about 50 psi to about 10,000 psi, from about 50 psi to about 1,000 psi, from about 50 psi to about 500 psi ($\approx$3450 kPa), from about 100 psi to about 50,000 psi, from about 100 psi to about 10,000 psi, from about 100 psi to about 1,000 psi, from about 100 psi to about 500 psi, from about 250 psi ($\approx$1720 kPa) to about 50,000 psi, from about 250 psi to about 10,000 psi, from about 250 psi to about 1,000 psi, from about 250 psi to about 500 psi, etc.

Examples of types of spheres in accordance with embodiments of the invention include lime boro-silicate, polystyrene, ceramic, recycled-glass, expanded glass, and lightweight polyolefin beads, and/or any other chemical form of plastic. For example, in some embodiments, spheres for use in the joint compound include but are not limited to soda lime boro-silicate glass bubbles (e.g., as marketed under the Scotchlite™ (3M) trade name), multi-cellular hollow glass microspheres (e.g., as marketed under the Omega-Bubbles™ (Omega Minerals) trade name), expandable polymeric microspheres (e.g., as marketed under the DUALITE® (Henkel) trade name), polyolefin micro beads and polystyrene microspheres (e.g., as marketed under the Spex•Lite® (Schabel Polymer Technology, LLC) trade name), expanded glass spheres (e.g., as marketed under the Poraver® North America trade name), and combinations thereof. As illustrative embodiments, suitable spheres can comprise Scotchlite™ (3M) K1 and/or K15.

The spheres can have any suitable diameter and can be provided in any suitable concentration. It will be understood that the term spheres is known in the art and does not imply a perfectly geometric sphere inasmuch as the spheres can have irregular shapes. Thus, the diameter as used herein refers to the diameter of the smallest geometric sphere that encompasses the actual sphere. In some embodiments, the spheres can have a diameter from about 10 microns to about 100 microns, such as from about 40 microns to about 80 microns, or from about 50 microns to about 70 microns. With respect to amounts, in some embodiments, the spheres are present in an amount from about 2% to about 50% by weight of the wet composition, such as, for example, from about 5% to about 35%, from about 7% to about 25%, or from about 10% to about 20%.

In some embodiments, the joint compound composition optionally also includes surfactant. Desirably, the surfactant can facilitate stabilizing binder so the binder does not flocculate. Surfactant also desirably can provide a wetting or dispersing action. In this respect, when dry raw materials are added to water, the dry materials can compete for water and form unwanted agglomerations. Thus, in some embodiments, the surfactant is included to increase the ease of mixing when incorporating dry materials in liquid, and further assists in pumping joint compound from fill stations and into pails during manufacture. The surfactant is also beneficial during use, when applying the joint compound, e.g., with dispensing tools known in the art.

For example, in some embodiments, the surfactant can be a nonionic surfactant having a hydrophilic-lipophilic balance (HLB) from about 3 to about 20, such as from about 4 to about 15, or from about 5 to about 10. It will be understood that surfactants with HLB values below 9 are generally considered to be lipophilic, those with values between 11 and 20 are generally considered to be hydrophilic, and those with values between 9 and 11 are generally considered to be intermediate. Suitable non-ionic surfactants having an HLB value below about 9 include, but are not limited to, octylphenol ethoxylates and nonylphenol ethoxylates, including non-ionic surfactants having HLB values below about 9 marketed under the TRITON™ and TERGITOL™ trade names (The Dow Chemical Company, Michigan). Suitable non-ionic surfactants having a HLB value greater than about 11 include octylphenol ethoxylates and nonylphenol ethoxylates which have more ethylene oxide units than the non-ionic surfactants having a HLB value below about 9. Useful surfactants having HLB values greater than about 11 are also marketed under the TRITON™ trade name (The Dow Chemical Company, Michigan). Other surfactants may also be used provided that the HLB value for the (blend of) surfactant(s) is as previously described for joint compound compositions, and combinations thereof. If included, the nonionic surfactant can be present in any suitable amount, such as from about 0.001% to about 15% by weight of the wet composition, such as from about 0.001% to about 10%, from about 0.001% to about 5%, or from about 0.01% to about 0.5%.

One or more defoamer, such as, for example, petroleum distillate or the like, as known in the art, is optionally included in some embodiments of the joint compound composition. If included, the defoamer can be present in an amount from about 0.01% to about 15% by weight of the wet composition, such as from about 0.05% to about 5%, or from about 0.3% to about 1%.

Humectant is optionally included in some embodiments. For example, humectants can be used to help keep the joint compound wetter by facilitating retention of moisture and can also aid with use of mechanical dispensing tools. In particular, one or more humectants is included in embodiments of aqueous joint compound composition in order to slow the drying of the joint compound composition and provide a more consistent finish. Humectants can also advantageously provide freeze thaw tolerance and/or stability in the joint compound composition. Any suitable humectants can be included, such as, for example, sorbitol derivatives, polyhydric alcohols including but not limited to glycols such as ethylene glycol, diethylene glycol (DEG), triethylene glycol, propylene glycol, di-propylene glycol, and/or tri-propylene glycol, or any combination thereof. If included, the humectants can be included in an amount from about 0.001% to about 15% by weight of the wet composition, such as from about 0.001% to about 10%, from about 0.01% to about 5%, or from about 0.001% to about 3%.

Optionally, the joint compound composition comprises a rheological modifier in some embodiments. If included, the rheological modifier is generally provided to enhance certain rheological properties such as the flow, viscosity, application properties, and other performance attributes associated with joint compounds. For example, in some embodiments, rheological modifiers are often added to provide the coating compositions with desired viscosity values as described herein, e.g., using C.W. Brabender visco-corder equipment for measuring the viscosity of the joint compound composition.

Suitable rheological modifiers for optional use in the joint compound composition include, but are not limited to, cellulosic, gelling clays, associative thickeners, including but limited to, hydrophobically modified ethoxylated urethanes (HEUR), hydrophobically modified alkali-swellable emulsions (HASE), and styrene-maleic anhydride terpolymers (SMAT), and combinations thereof. Exemplary cellulosic rheological modifiers, include but are not limited to cellulose ethers such as hydroxyethyl cellulose (HEC), ethylhydroxyethyl cellulose (EHEC), methylhydroxyethyl cellulose (MHEC), carboxymethyl cellulose (CMC), hydroxypropylmethyl cellulose (HPMC), and/or other cellulose ethers having a molecular weight between about 1000 and 500,000 daltons, e.g., alkyl hydroxypropyl cellulose ethers, hydroxypropyl methyl celluloses, as well as xanthan gums, sodium alginates and other salts of alginic acid, carrageenans, gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives, locust bean gum (a branched galactomannan), tamarind gum, psyllium seed gum, quince seed gum, larch gum, pectin and its derivatives, dextrans, and hydroxypropylcelluloses, or any combination thereof.

If included, the rheological modifier can be included in any suitable amount, e.g., to achieve a desired viscosity as will be appreciated by one of ordinary skill in the art. For example, in some embodiments, the rheological modifier is included in an amount from about 0.01% to about 15% by weight of the composition, such as from about 0.01% to about 10%, from about 0.1% to about 5%, from about 0.1% to about 3%, from about 0.1% to about 2%, or from about 0.1% to about 1%. The joint compound typically comprises from about 0.01 wt. % to about 10 wt. %, about 0.1 wt. % to about 5.0 wt. %, and/or about 0.10 wt. % to about 3.0 wt. % of the cellulosic thickener. The alkyl group of useful alkyl hydroxypropyl celluloses may contain up to 9 carbon atoms, but usually the alkyl group contains from one to three atoms. Hydroxypropyl methyl celluloses having an average of about two hydroxypropyl and/or methoxypropyl groups per anhydroglucose unit are often used. The viscosity of an aqueous solution containing about 2 wt. % of a suitable alkyl hydroxypropyl cellulose ether at 20° C. is about 60,000 centipoises (cps) to about 90,000 cps as measured with an Ubbelohde tube capillary viscometer. Alternatively, similar measurements can be made with a Brookfield rotational viscometer at a speed between about 2.5 rpm and 5 rpm. In one refinement, the initially solid-colored coating composition contains about 0.25 wt. % of an alkyl hydroxypropyl cellulose ether. Of course, other types of cellulosic thickeners may also be used, and a greater quantity may be needed if a lower viscosity thickener is used (or vice versa). Exemplary alkyl hydroxypropyl cellulose ethers are marketed under the Methocel® trade name (The Dow Chemical Company, Michigan).

Suitable associative thickeners for optional use in the joint compound compositions include hydrophobically modified ethoxylated urethanes (HEUR), hydrophobically modified alkali-swellable emulsions (HASE), and styrene-maleic anhydride terpolymers (SMAT). HEUR thickeners (also generally known as polyurethane or PUR associative thickeners) can be included in aqueous, latex-based joint compound and other yield stress fluid/solid like compositions. Acidic acrylate copolymers (cross-linked) of ethyl acrylate and methacrylic acid, and acrylic terpolymers (cross-linked) of ethyl acrylate, methacrylic acid, and nonionic urethane surfactant monomer may also optionally be used as associative thickeners. When one or more suitable associative thickeners are used, the thickening reaction is caused in part by either association between the associative thickener and at least one other particle of the joint compound composition (e.g., a pigment particle or resin particle) or another associative thickener molecule. In various embodiments, if included, the joint compound composition can comprise from about 0.01 wt. % to about 10 wt. %, about 0.1 wt. % to about 5.0 wt. %, and/or about 0.1 wt. % to about 3 wt. % of the associative thickener. Useful associative thickeners include those marketed under the Alcogum® trade name (Alco Chemical Company, TN), the Acrysol® trade name (Rohm & Haas, PA), and the Viscalex® trade name (Ciba Specialty Chemicals, NY).

In one illustrative embodiment, the rheological modifier comprises a HEUR and a cellulose ether, e.g., an alkyl hydroxypropyl cellulose ether. Without intending to be bound by any particular theory, it is believed that the combination of an associative thickener and a cellulose ether provides improved application and storage properties. For example, the lubricity and flow characteristic of the joint compound compositions (when applied to a substrate) can be improved by using such a combination of associative thickener and cellulose ether. Additionally, such a combination can help prevent the spheres of the joint compound compositions from settling out (when the joint compound compositions are stored in bulk).

The rheologically modified associative thickener system generally performs best under alkaline conditions. Thus, it is generally advisable to include a basic material in the joint compound composition in order to give the final joint compound composition a pH of at least about 8.0. A variety of basic materials may be used to increase the pH including but not limited to ammonia, caustic soda (sodium hydroxide), tri-ethylamine (TEA), and 2-amino-2-methyl-1 propanol (AMP). In various embodiments, the joint compound composition comprises about 0.001 wt. % to about 10 wt. %, about 0.01 wt. % to about 0.5 wt. %, and/or about 0.01 wt. % to about 0.50 wt. % of the alkaline/basic material.

Suitable gelling clays can optionally be included in some embodiments of joint compound including hormite clays comprising natural and/or synthetic dimensionally layered sheet structures of tetrahedrally coordinated silica linked to parallel sheets of octahedrally coordinated alumina, magnesium oxide, silicates, and/or phyllosilicates. Such gelling clays include but are not limited to attapulgites, sepiolites, bentonites, laponites, nontronites, beidellites, laponites, yakhontovites, zincsilites, volkonskoites, hectorites, saponites, ferrosaponites, sauconites, swinefordites, pimelites, sobockites, stevensites, svinfordites, vermiculites, water-swellable synthetic clays, smectites, e.g., montmorillonites, particularly sodium montmorillonite, magnesium montmorillonite, and calcium montmorillonite, illites, mixed layered illite/smectite minerals such as rectorites, tarosovites, and ledikites, magnesium aluminum silicates, and admixtures of the clays named above. Palygorskite attapulgite clays are one type of illustrative embodiment. If included, the joint compound typically comprises from about 0.01 wt. % to about 15 wt. %, about 0.05 wt. % to about 10.0 wt. %, and/or about 0.10 wt. % to about 5.0 wt. % of the gelling clay. Useful gelling clays include those marketed under the Min-U-Gel® trade name (Floridin Company, FL), and those marketed under the Attagel® trade name (Engelhard Corporation, NJ). Such clays are available in different particle sizes.

In some embodiments, joint compound composition optionally comprises biocide in any suitable amount, e.g., from about 0% to about 3% by weight of the composition, such as from about 0.05% to about 2%, from about 0.1% to about 1.5%, or from about 0.1% to about 1%. If included, in some embodiments of joint compound composition, the biocide comprises a bactericide and/or a fungicide. An illustrative useful bactericide is marketed under the MERGAL 174® trade name (TROY Chemical Corporation). An illustrative useful fungicide is marketed under the FUNGITROL® trade name (International Specialty Products, New Jersey), or any combination thereof.

The joint compound composition can be formulated to have any suitable viscosity to allow for workability as will be understood in the art. For example, the viscosity of the joint compound composition when wet can have a viscosity from about 100 Brabender units (BU) to about 700 BU, such as from about 100 BU to about 600 BU, about 100 BU to about 500 BU, about 100 BU to about 400 BU, about 100 BU to about 300 BU, about 100 BU to about 200 BU, about 130 BU to about 700 BU, about 130 BU to about 600 BU, about 130 BU to about 500 BU, about 130 BU to about 400 BU, about 130 BU to about 300 BU, about 130 BU to about 200 BU, about 150 BU to about 700 BU, about 150 BU to about 600 BU, about 150 BU to about 500 BU, about 150 BU to about 400 BU, about 150 BU to about 300 BU, or about 150 BU to about 200 BU. One of ordinary skill in the art will readily recognize Brabender units. The viscosity is measured according to ASTM C474-05, Section 5 using a CW Brabender viscometer with a Type-A Pin, sample cup size of ½ pint with a 250 cm-gm cartridge Brabender Torque-Head and an RPM of 75.

Desirably, in some embodiments, to enhance the anti-shrinkage property of the joint compound composition, water content is desirably reduced compared with conventional formulations. It will be understood that some raw materials (e.g., latex emulsions and the like) are provided in an aqueous form. However, additional water (e.g., gauging water) is desirably kept low in some embodiments, e.g., in an amount of about 60% or less by weight of the composition, e.g., from about 0% to about 50%, such from about 0% to about 30%, from about 0% to about 15%, or from about 0% to about 10%, etc. In some embodiments, the total water content of the joint compound, including water from other raw material including latex emulsion binder, and any gauging water, could range, e.g., from about 5% to about 60% by weight of the composition, such as from about 10% to about 45% by weight, or from about 25% to about 45% by weight, or over.

In some embodiments, the invention provides a joint compound composition consisting essentially of (a) latex emulsion binder in an amount from about 3% to about 90% by weight of the wet composition; (b) a plurality of hollow spheres having an average isostatic crush strength of at least about 100 psi, as measured according to ASTM D3102-78, wherein the spheres are present in an amount from about 5% to about 25% by weight of the wet composition; (c) nonionic surfactant in an amount from about 0.001% to about 5% by weight of the wet composition; and (d) humectant in an amount from about 0.001% to about 3% by weight of the wet composition; and, optionally, (e) defoamer in an amount from about 0.05% to about 5% by weight of the wet composition; (f) rheological modifier in an amount from about 0.1% to about 5% by weight of the wet composition; and (g) biocide, in an amount from about 0.1% to about 1.5% by weight of the wet composition. In such embodiments, the composition precludes the inclusion of any compound other than the aforesaid ingredients that materially affects the inventive joint compound composition (e.g., with good flexural strength and low shrinkage property). Thus, compounds that would be excluded in a composition consisting essentially of the aforesaid components would include setting-type materials such as calcined gypsum, cement, or other hydraulically setting materials, bulk filler, clays, starch, mica, or a combination thereof, such as, for example, calcium carbonate, expanded perlite, calcium magnesium carbonate, limestone, calcium sulfate dihydrate, attapulgite clay, kaolin clay, talcs, and diatomaceous earth and/or a combination thereof. Compounds that would not be excluded in a joint compound composition consisting essentially of the aforesaid components, are compounds that do not materially affect the joint compound composition, such as defoamers, preservatives, solvents and other additives (e.g., associative thickener, gelling clay, biocides, colorings), as well as other compounds that do not significantly negatively affect the desired joint compound properties, such as flexibility or shrinkage properties.

Embodiments of the invention also provide a wall assembly in accordance with the various aspects described herein. The wall assembly comprises two adjacent boards, joined by a seam. In some embodiments, only one-coat of the joint compound is applied over the seam to provide a uniform aesthetic appearance. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi, as measured according to ASTM D3102-78. The wall assembly further comprises dimensionally stable, non-swelling flat joint tape embedded in the seam.

Embodiments of the invention also provide a method of treating a wallboard assembly of two adjacent boards joined by a seam in accordance with the various aspects described herein. In some embodiments, the method comprises applying joint tape and one coat of the joint compound composition to the seam. The joint compound composition comprises binder selected from acrylic acid polymers, acrylic acid copolymers, alkyds, polyurethanes, polyesters, epoxies, and combinations thereof. The composition also comprises a plurality of hollow spheres. The spheres desirably have an average isostatic crush strength of at least about 100 psi, as measured according to ASTM D3102-78. The method further comprises drying the composition. In some embodiments, after the joint compound is applied and dried, the wallboard assembly can be sanded and/or painted to give a desired visual appearance.

The following examples further illustrate the invention but, of course, should not be construed as in any way limiting its scope.

Example 1

This example sets forth three sample formulations (1A, 1B, and 1C) illustrating joint compound in accordance with embodiments of the invention.

As an illustrative method of preparation, all of the liquid ingredients were added to a Hobart Model N50 mixer. In this respect, it is to be noted that the functional filler (Scotchlite K1) and rheological polymer (Cellosize DSC) were the only dry materials, with the remainder considered to be in liquid form for purposes of addition to the mixer. Since the functional filler was in bulk form and the rheological polymer was in a small quantity, the rheological polymer was added to the functional filler, and the combined dry material was added to the mixer with the liquids already included. The resulting composition was mixed for approximately two minutes until uniform.

However, it will be understood that the formulations can be prepared in any suitable manner. For example, the composition can be prepared on a plant scale in horizontal shafted mixer with helical blade configuration or the like to promote suitable mixing dynamics as will be understood by one of ordinary skill in the art.

Formulation 1A is set forth in Table 1 below. It will be understood "added water" refers to additional water not already present in any of the ingredients (e.g., RHOPLEX is in the form of a 47/53 solids/water emulsion by weight).

TABLE 1

| Formulation 1A | | | |
|---|---|---|---|
| Ingredient | Type | Weight (lb) | Wt. % |
| Polyacrylate Ester Emulsion (RHOPLEX E-330 ™) Rohm & Haas (UK) | Binder | 700 | 71.6% |
| Petroleum Distillate (Bubreak 4412 ™) Buckman Laboratories (Memphis, TN) | Defoamer | 4 | 0.4% |
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 15.3% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158 ™) International Specialty Products (Wayne, NJ) | Biocide | 1 | 0.1% |
| Ethylene Glycol ME Global (Dubai, United Arab Emirates) | Humectant | 15 | 1.5% |

TABLE 1-continued

| Formulation 1A | | | |
|---|---|---|---|
| Ingredient | Type | Weight (lb) | Wt. % |
| Hydroxyethyl Cellulose (Cellosize DSC ™) The Dow Chemical Company (Midland, MI) | Rheological Polymer | 5 | 0.5% |
| Methylacrylate-based Emulsion Copolymer (Alcogum L-62 ™) Akzo Nobel (Amsterdam, Netherlands) | Rheology Modifier | 0 | 0.0% |
| Added Water | | 100 | 10.2% |
| Totals | | 978 | 100.0% |

Formulation 1B is set forth in Table 2 below.

TABLE 2

| Formulation 1B | | | |
|---|---|---|---|
| Ingredient | Type | Weight (lb) | Wt. % |
| Polyacrylate Ester Emulsion (RHOPLEX E-330 ™) Rohm & Haas (UK) | Binder | 900 | 83.8% |
| Petroleum Distillate (Bubreak 4412 ™) Buckman Laboratories (Memphis, TN) | Defoamer | 0 | 0.0% |
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 14.0% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158 ™) International Specialty Products (Wayne, NJ) | Biocide | 1 | 0.1% |
| Ethylene Glycol ME Global (Dubai, United Arab Emirates) | Humectant | 15 | 1.4% |
| Hydroxyethyl Cellulose (Cellosize DSC ™) The Dow Chemical Company (Midland, MI) | Rheological Polymer | 5 | 0.5% |
| Methylacrylate-based Emulsion Copolymer (Alcogum L-62 ™) Akzo Nobel (Amsterdam, Netherlands) | Rheology Modifier | 0 | 0.0% |
| Added Water | | 0 | 0.0% |
| Totals | | 1074 | 100.0% |

Formulation 1C is set forth in Table 3 below.

TABLE 3

| Formulation 1C | | | |
|---|---|---|---|
| Ingredient | Type | Weight (lb) | Wt. % |
| Polyacrylate Ester Emulsion (RHOPLEX E-330 ™) Rohm & Haas (UK) | Binder | 800 | 74.3% |
| Petroleum Distillate (Bubreak 4412 ™) Buckman Laboratories (Memphis, TN) | Defoamer | 3 | 0.3% |

TABLE 3-continued

Formulation 1C

| Ingredient | Type | Weight (lb) | Wt. % |
|---|---|---|---|
| Octylphenol Ethoxylate (TRITON X-405 ™) The Dow Chemical Company (Midland, MI) | Surfactant | 2 | 0.2% |
| Soda-Lime-Borosilicate Glass Bubbles (SCOTCHLITE K1 ™) 3M (St. Paul, MN) | Functional Filler | 150 | 13.9% |
| 2((Hydroxymethyl)amino)ethanol (MERGAL 174 ™) Troy Chemical Corporation (Florham Park, NJ) | Biocide | 1 | 0.1% |
| Tributyltin Benzoate (FUNGITROL 158 ™) International Specialty Products (Wayne, NJ) | Biocide | 1 | 0.1% |
| Ethylene Glycol ME Global (Dubai, United Arab Emirates) | Humectant | 15 | 1.4% |
| Hydroxyethyl Cellulose (Cellosize DSC ™) The Dow Chemical Company (Midland, MI) | Rheological Polymer | 2 | 0.2% |
| Methylacrylate-based Emulsion Copolymer (Alcogum L-62 ™) Akzo Nobel (Amsterdam, Netherlands) | Rheology Modifier | 6 | 0.6% |
| Added Water | | 97 | 9.0% |
| Totals | | 1077 | 100.0% |

The formulations set forth in Table 1 include relatively low amounts of water and result in low shrinkage levels, while also exhibiting good compressive strength and flexural strength. They can readily be applied with less coats than what is normally done in conventional systems (e.g., desirably in a one-coat application system) to seams, trim, and fasteners in wall assemblies, in accordance with some embodiments of the invention. As result, formulations 1A-1C permit efficient application without considerable delays requiring downtime as separate coats dry. The formulations 1A-1C also allow for easy application with less skill required for the user since the formulations can be applied closer to the plane of wall assemblies to which the formulations can be applied. The samples 1A-1C exhibited shrinkage from about zero to about 3%, as measured in accordance with ASTM C474-05, Section 6. In addition, samples 1A-1C were crack resistant when measured in accordance with ASTM C474-05, Section 7.

Example 2

This Example illustrates the superior properties exhibited by joint compound in accordance with embodiments of the invention as compared with two different conventional joint compounds.

A total of three specimens were tested for flexural strength. Each joint compound specimen was formed and dried into a strip having a length of 10 inches, a width of 2 inches, and a thickness of 0.0625 inches. Each specimen was placed on a table with its ends seated on 0.125 (⅛) inch thick spacers in order to demonstrate that, with the slightest displacement, the brittle nature and friability associated with representative samples of commercially available joint compound product formulations used in the industry. A down force of about 200 gm was applied to the center of each joint compound strip by way of metal probe.

Figure 19:
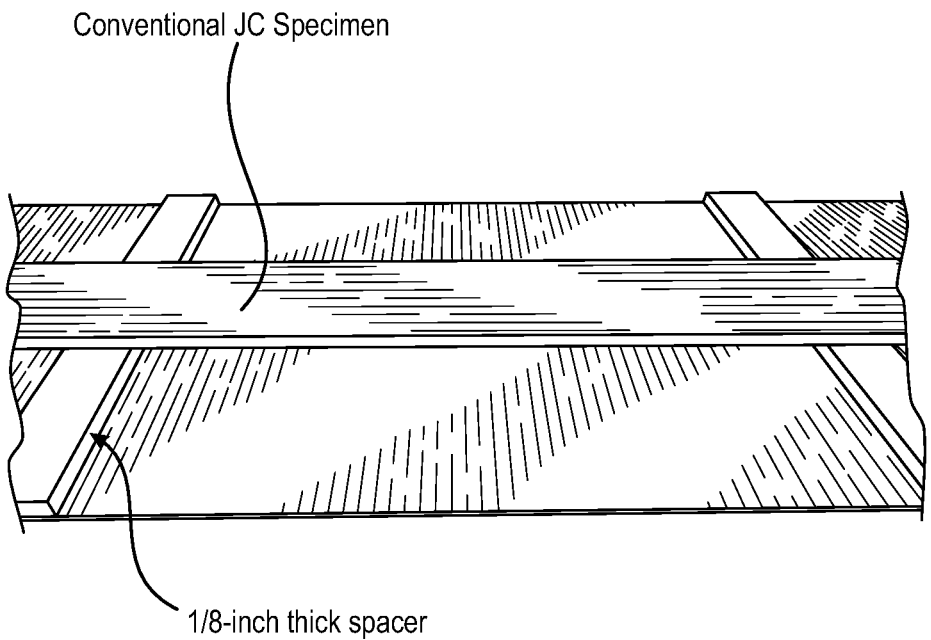
FIGS. 19-21 illustrate the progression of a flexural strength test for sample 2A of Example 2 for comparison purposes.
Figure 20:
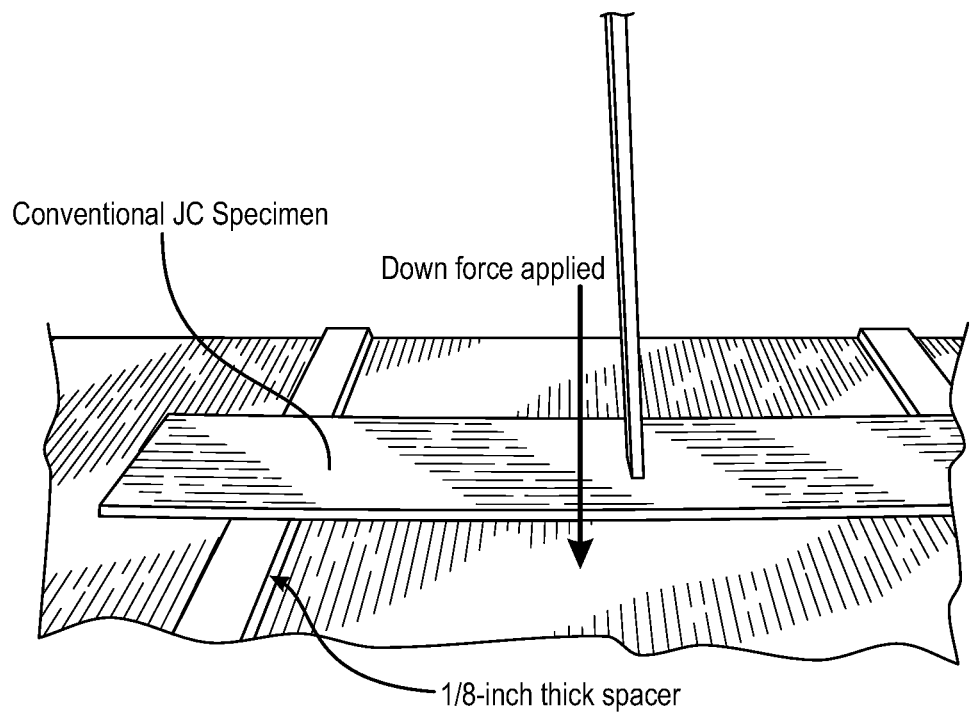
Figure 21:
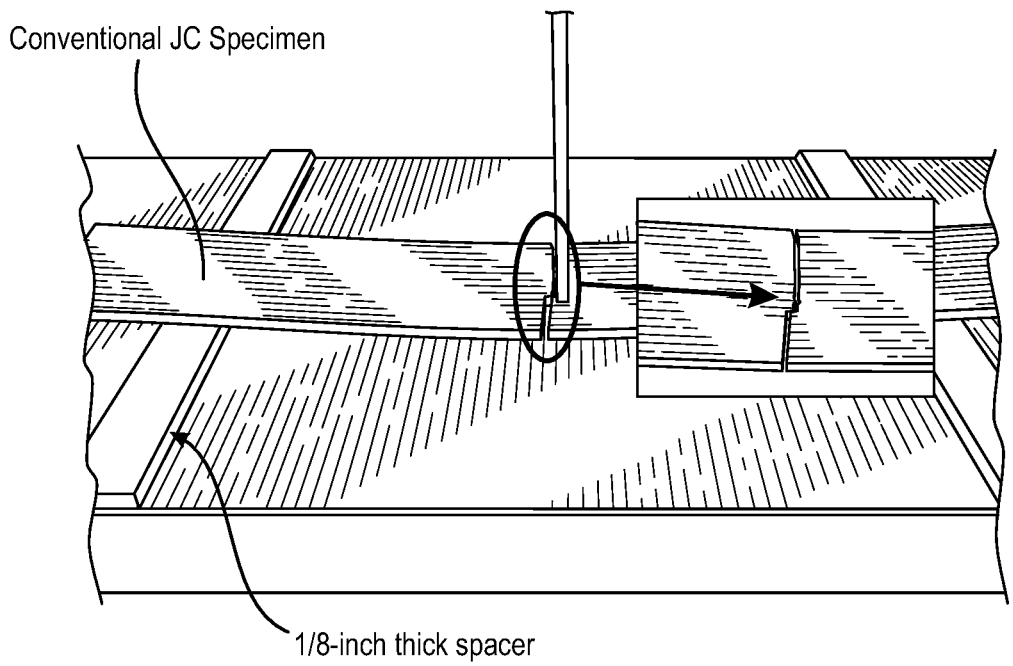

For comparative purposes, the first specimen, numbered 2A, was a conventional joint compound commercially available as SHEETROCK® Brand Lightweight All Purpose Joint Compound from USG and having a density of approximately 14 lb/gal. The progression of the test is shown in FIGS. 19-21. As seen in FIG. 21, the joint compound broke with less than ⅛ inch deflection, thereby showing the brittle nature of the specimen.

Figure 22:
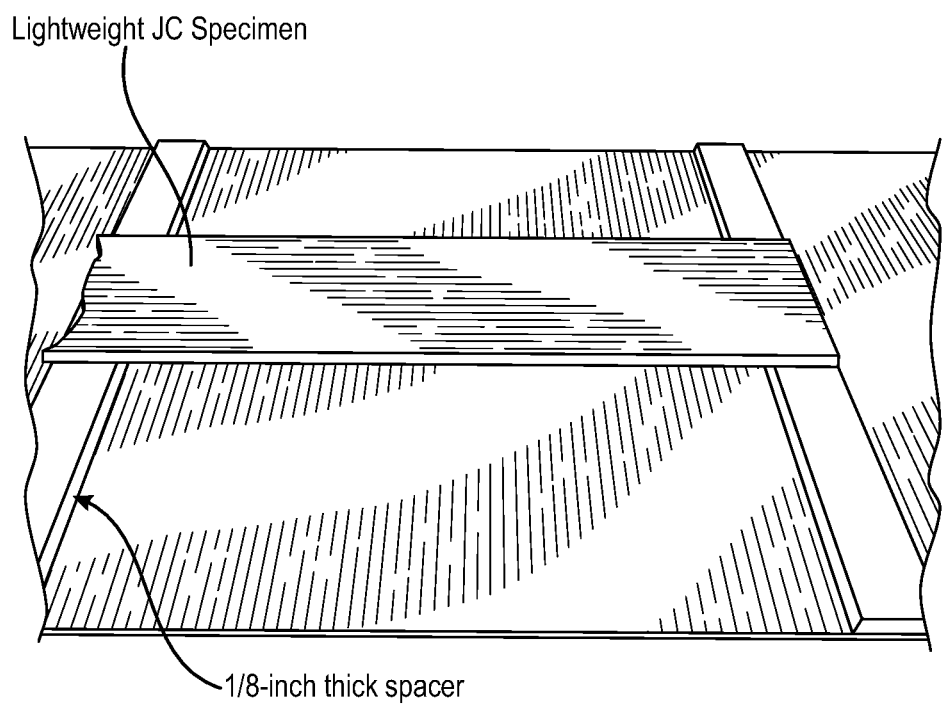
FIGS. 22-24 illustrate the progression of a flexural strength test for sample 2B of Example 2 for comparison purposes.
Figure 23:
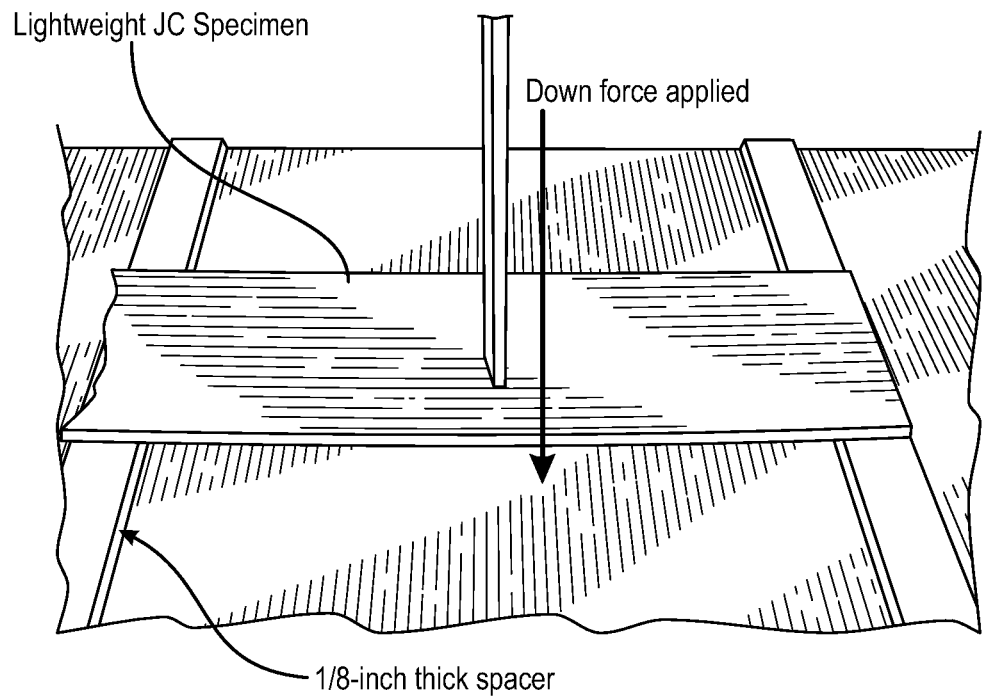
Figure 24:
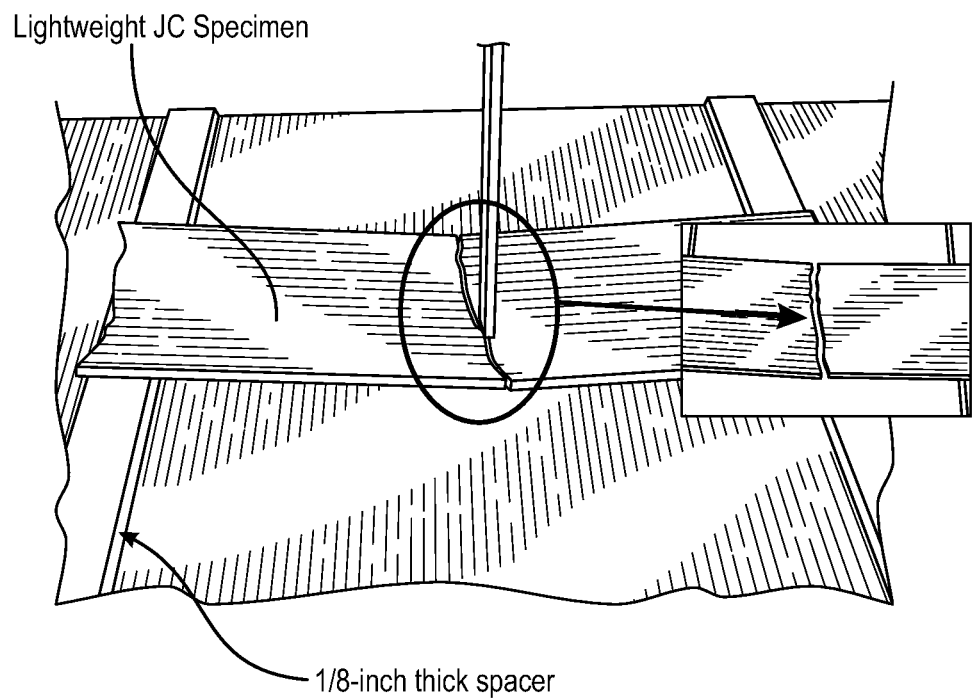

Specimen 2B was another comparative specimen. It was a conventional joint compound commercially available as SHEETROCK® Brand All Purpose Joint Compound from USG, and having a density of approximately 8 lb/gal. The progression of the test is shown in FIGS. 22-24. As seen in FIG. 24, the joint compound broke with less than ⅛ inch deflection, thereby showing the brittle nature of the specimen.

Figure 25:
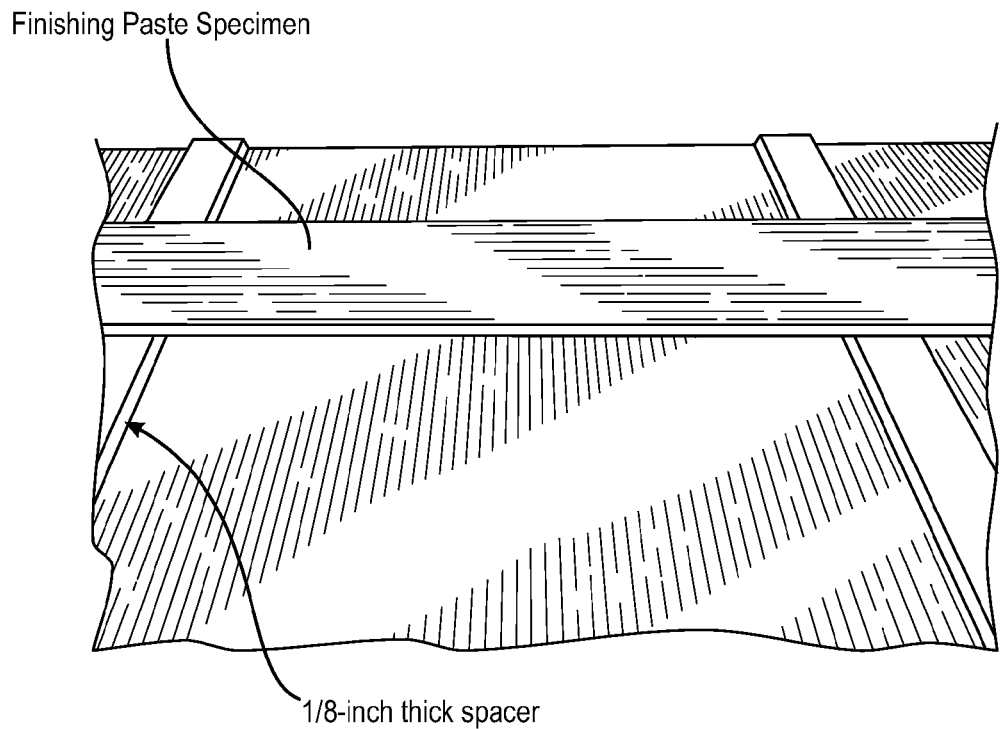
FIGS. 25-27 illustrate the progression of a flexural strength test for sample 2C of Example 2, in accordance with embodiments of the invention.
Figure 26:
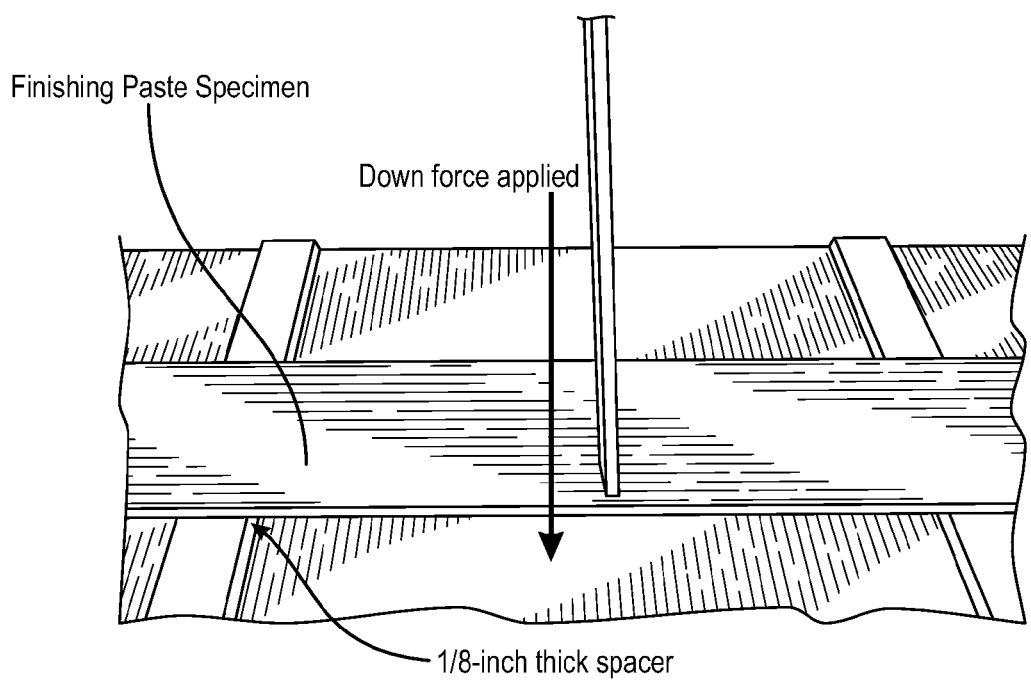
Figure 27:
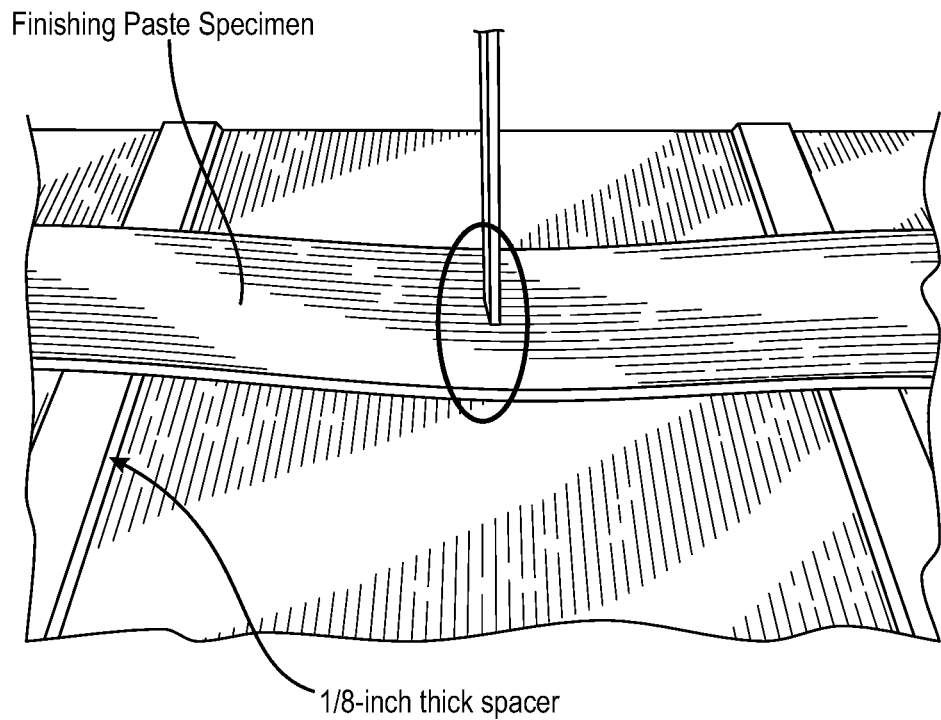
Figure 28:
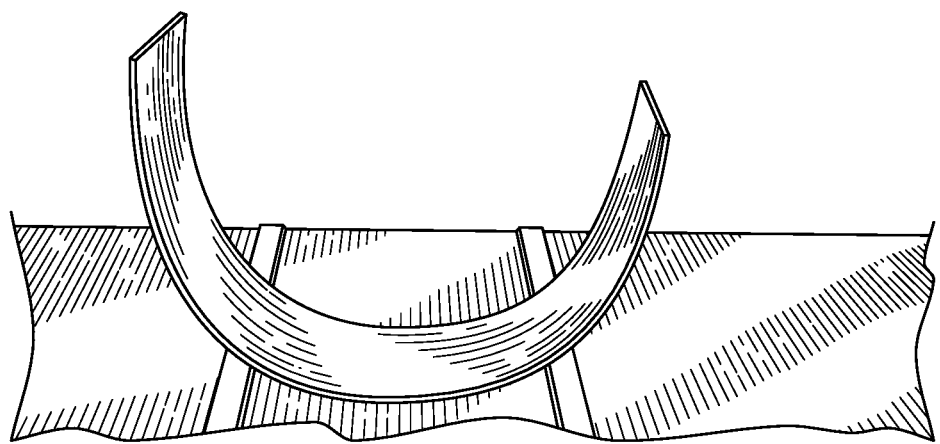
FIGS. 28-29 depict the flexural strength for sample 2C of Example 2, in accordance with embodiments of the invention.
Figure 29:
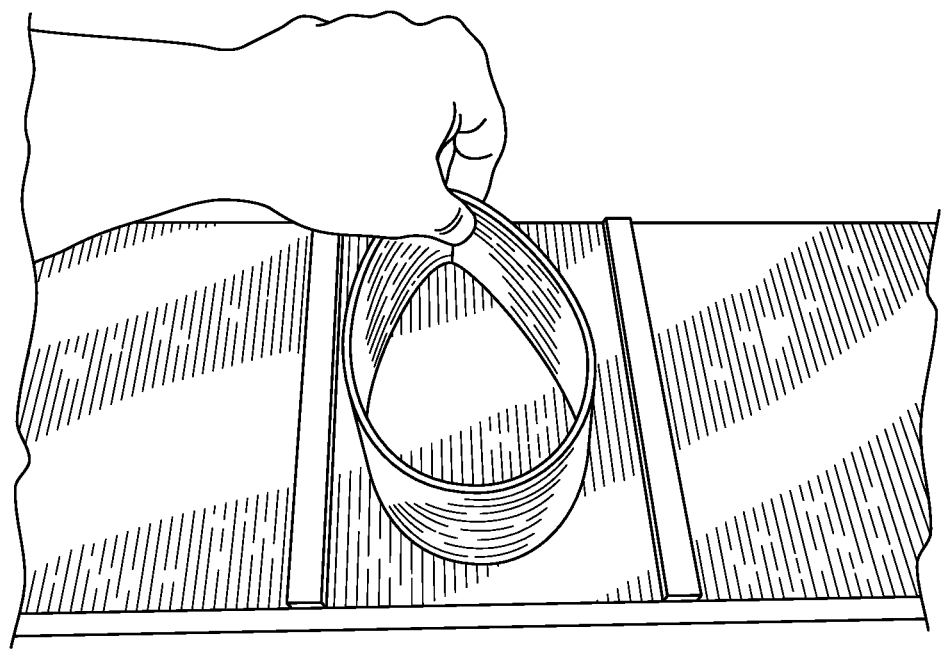

The third specimen, 2C, was prepared in accordance with sample 1A set forth in Table 1, in accordance with embodiments of the invention. The third specimen had a density of 3 lb/gal. The progression of the test is shown in FIGS. 25-27. As seen in FIG. 27, after ⅛ inch deflection, the sample did not crack (unlike comparative specimens 2A and 2B). Moreover, as seen in FIG. 28, specimen 2C did not crack or break as it was bent even more. In fact, even as specimen 2C was bent all the way to form a loop, as seen in FIG. 29, the sample did not break or crack.

It will be understood that specimen 2C imparted the most desirable finishing attributes of a drywall joint compound. For example, sample 2C did not shrink when dry. In addition, specimen 2C remained flexible enough to resist cracking (as opposed to conventional brittle compounds shown in 2A and 2B) yet was sufficiently rigid to enable easy sanding and smoothing over the surface. Specimen 2C could also be easily painted.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A kit comprising
a reinforcement trim for protecting a seam of two adjacent boards, the trim comprising:
 a paper face comprising at least one of the following: a non-swelling natural paper facing material and a non-swelling synthetic paper facing material; and
 a reinforcement backing comprising a sturdy, rust-resistant material which imparts a corner angle shape to the trim, and wherein the paper face is laminated to the reinforcement backing; and
a joint compound comprising a latex emulsion binder selected from the group consisting of acrylic acid polymers, acrylic acid copolymers, alkyds, polyurethanes, polyesters, epoxies and combinations thereof, wherein the binder is used in an amount from about 3% to about 90% by weight of the wet composition; and a plurality of hollow spheres having an average isostatic crush strength of at least about 100 psi, as measured according to ASTM D3102-78, wherein the spheres are present in an amount from about 5% to about 25% by weight of the wet composition.

2. The kit of claim 1, wherein the reinforcement backing of the trim comprises at least one material selected from the group consisting of: galvanized steel, composite laminate structure layered paper, carbon fiber, polyester, polycarbonate, spun polyolefin, natural fiber, synthetic fiber, and fiberglass.

3. The kit of claim 1, wherein the reinforcement backing of the trim has a thickness from about 0.012 inches to about 0.0625 inches.

4. The kit of claim 1, wherein a width of the paper face of the trim is larger than a width of the reinforcement backing such that a portion of paper face extends beyond the reinforcement backing and is not in a contact with the reinforcement backing.

5. The kit of claim 1, wherein the paper face of the trim has a dimensional stability of less than about 0.4% machine direction (MD) expansion and less than about 2.5% cross machine direction (CD) expansion.

6. The kit of claim 1, wherein the paper face of the trim has a thickness from about 0.01 inch to about 0.125 inches.

7. The kit of claim 1, wherein the reinforcement backing of the trim is made of galvanized steel and imparts a rockwell hardness scale B from about 45 to about 85, when measured according to ASTM E18-03.

8. The kit of claim 1, wherein the paper face of the trim is hot-melt glued to the reinforcement backing.

9. A method for assembling a wall, the method comprising:
obtaining a first gypsum board and a second gypsum board, each board having a face surface and a back surface;
joining the first board with the second board at an angle, and thereby creating a corner seam, wherein the boards are joined such that the two face surfaces are on the same side and create a combined face surface, and wherein the corner seam has an inside surface and outside surface;
disposing over at least one of the inside-surface and outside surface of the corner seam a reinforcement trim comprising:
 a paper face comprising at least one of the following: a non-swelling natural paper facing material and a non-swelling synthetic paper facing material; and
 a reinforcement backing comprising a sturdy, rust-resistant material which imparts a corner angle shape to the trim, and wherein the paper face is laminated to the reinforcement backing; and
applying a joint compound over the trim, wherein the joint compound comprises a latex emulsion binder selected from the group consisting of acrylic acid polymers, acrylic acid copolymers, alkyds, polyurethanes, polyesters, epoxies and combinations thereof, wherein the binder is used in an amount from about 3% to about 90% by weight of the wet composition; and a plurality of hollow spheres having an average isostatic crush strength of at least about 100 psi, as measured according to ASTM D3102-78, wherein the spheres are present in an amount from about 5% to about 25% by weight of the wet composition.

10. The method claim 9, wherein the joint compound is applied in one coat.

11. The method of claim 9, wherein the trim is attached to the seam by an adhesive.

12. The method of claim 9, wherein the reinforcement backing of the trim comprises at least one material selected from the group consisting of: galvanized steel, composite laminate structure layered paper, carbon fiber, polyester, polycarbonate, spun polyolefin, natural fiber, synthetic fiber, and fiberglass.

13. The method of claim 9, wherein the reinforcement backing of the trim has a thickness from about 0.012 inches to about 0.0625 inches.

14. The method of claim 9, wherein a width of the paper face of the trim is larger than a width of the reinforcement backing such that a portion of paper face extends beyond the reinforcement backing and is not in a contact with the reinforcement backing.

15. The method of claim 9, wherein the paper face of the trim has a dimensional stability of less than about 0.4% machine direction (MD) expansion and less than about 2.5% cross machine direction (CD) expansion.

16. The method of claim 9, wherein the paper face of the trim has a thickness from about 0.01 inch to about 0.125 inches.

17. The method of claim 9, wherein the reinforcement backing of the trim is made of galvanized steel and imparts a rockwell hardness scale B from about 45 to about 85, when measured according to ASTM E18-03.

18. The method of claim 9, wherein the paper face of the trim is hot-melt glued to the reinforcement backing.

* * * * *